United States Patent
Vinnik et al.

(10) Patent No.: US 9,712,510 B2
(45) Date of Patent: Jul. 18, 2017

(54) SYSTEMS AND METHODS FOR SECURELY SUBMITTING COMMENTS AMONG USERS VIA EXTERNAL MESSAGING APPLICATIONS IN A CLOUD-BASED PLATFORM

(71) Applicant: Box, Inc., Los Altos, CA (US)

(72) Inventors: Natalia Vinnik, Mountain View, CA (US); Chris Byron, San Francisco, CA (US)

(73) Assignee: Box, Inc., Redwood City, CA (US)

( * ) Notice: Subject to any disclaimer, the term of this patent is extended or adjusted under 35 U.S.C. 154(b) by 406 days.

(21) Appl. No.: 13/937,124

(22) Filed: Jul. 8, 2013

(65) Prior Publication Data

US 2014/0013104 A1    Jan. 9, 2014

Related U.S. Application Data

(60) Provisional application No. 61/668,791, filed on Jul. 6, 2012.

(51) Int. Cl.
  *H04L 29/06* (2006.01)
(52) U.S. Cl.
  CPC ............ *H04L 63/08* (2013.01); *H04L 63/123* (2013.01)
(58) Field of Classification Search
  CPC ......... G06Q 50/01; G06F 21/31; H04L 51/32; H04L 67/1076; H04L 67/12; H04L 65/60; H04N 7/17318
  USPC ............. 713/150; 709/230–23; 370/229, 470
  See application file for complete search history.

(56) References Cited

U.S. PATENT DOCUMENTS

| | | |
|---|---|---|
| 858,619 A | 7/1907 | O'Farrell |
| 4,588,991 A | 5/1986 | Atalla |
| 5,481,610 A | 1/1996 | Doiron et al. |
| 5,604,800 A | 2/1997 | Johnson et al. |
| 5,748,735 A | 5/1998 | Ganesan |
| 5,787,175 A | 7/1998 | Carter |
| 5,799,320 A | 8/1998 | Klug |

(Continued)

FOREIGN PATENT DOCUMENTS

| | | |
|---|---|---|
| CA | 2724521 | 11/2009 |
| CN | 101997924 A | 3/2011 |

(Continued)

OTHER PUBLICATIONS

Extended Search Report for EP131832800, Applicant: Box, Inc. Mailed Aug. 25, 2014, 7 pages.

(Continued)

*Primary Examiner* — Evans Desrosiers
(74) *Attorney, Agent, or Firm* — Perkins Coie LLP

(57) ABSTRACT

Systems and methods are disclosed for facilitating secure commenting on content items among collaborators via external messaging applications in a collaborative cloud-based environment. In one embodiment, the system receives a response to a notification associated with a content item from a collaborator via an external messaging application. The response can include a text-based comment associated with the content item and secure message information provided by the notification including a message and a message authentication code. The system then determines a validity of the response. The validity of the response can include verifying the integrity of the message using the message authentication code.

28 Claims, 12 Drawing Sheets

(56) References Cited

U.S. PATENT DOCUMENTS

| | | |
|---|---|---|
| 5,848,415 A | 12/1998 | Guck |
| 5,999,908 A | 12/1999 | Abelow |
| 6,016,467 A | 1/2000 | Newsted et al. |
| 6,034,621 A | 3/2000 | Kaufman |
| 6,055,543 A | 4/2000 | Christensen et al. |
| 6,073,161 A | 6/2000 | DeBoskey et al. |
| 6,098,078 A | 8/2000 | Gehani et al. |
| 6,226,618 B1 | 5/2001 | Downs et al. |
| 6,233,600 B1 | 5/2001 | Salas et al. |
| 6,260,040 B1 | 7/2001 | Kauffman et al. |
| 6,289,345 B1 | 9/2001 | Yasue |
| 6,292,803 B1 | 9/2001 | Richardson et al. |
| 6,336,124 B1 | 1/2002 | Alam et al. |
| 6,342,906 B1 | 1/2002 | Kumar et al. |
| 6,345,386 B1 | 2/2002 | Delo et al. |
| 6,370,543 B2 | 4/2002 | Hoffert et al. |
| 6,374,260 B1 | 4/2002 | Hoffert et al. |
| 6,385,606 B2 | 5/2002 | Inohara et al. |
| 6,396,593 B1 | 5/2002 | Laverty et al. |
| 6,441,641 B1 | 8/2002 | Pang et al. |
| 6,515,681 B1 | 2/2003 | Knight |
| 6,539,381 B1 | 3/2003 | Prasad et al. |
| 6,584,466 B1 | 6/2003 | Serbinis et al. |
| 6,636,872 B1 | 10/2003 | Heath et al. |
| 6,636,897 B1 | 10/2003 | Sherman et al. |
| 6,654,737 B1 | 11/2003 | Nunez |
| 6,662,186 B1 | 12/2003 | Esquibel et al. |
| 6,687,878 B1 | 2/2004 | Eintracht et al. |
| 6,714,968 B1 | 3/2004 | Prust |
| 6,735,623 B1 | 5/2004 | Prust |
| 6,742,181 B1 | 5/2004 | Koike et al. |
| 6,760,721 B1 | 7/2004 | Chasen et al. |
| 6,947,162 B2 | 9/2005 | Rosenberg et al. |
| 6,952,724 B2 | 10/2005 | Prust |
| 6,996,768 B1 | 2/2006 | Elo et al. |
| 7,003,667 B1 | 2/2006 | Slick et al. |
| 7,010,752 B2 | 3/2006 | Ly |
| 7,020,697 B1 | 3/2006 | Goodman et al. |
| 7,039,806 B1 | 5/2006 | Friedman et al. |
| 7,069,393 B2 | 6/2006 | Miyata et al. |
| 7,130,831 B2 | 10/2006 | Howard et al. |
| 7,133,834 B1 | 11/2006 | Abelow |
| 7,143,136 B1 | 11/2006 | Drenan et al. |
| 7,149,787 B1 | 12/2006 | Mutalik et al. |
| 7,152,182 B2 | 12/2006 | Ji et al. |
| 7,155,483 B1 | 12/2006 | Friend et al. |
| 7,165,107 B2 | 1/2007 | Pouyoul et al. |
| 7,178,021 B1 | 2/2007 | Hanna et al. |
| 7,222,078 B2 | 5/2007 | Abelow |
| 7,231,516 B1 | 6/2007 | Sparrell et al. |
| 7,275,244 B1 | 9/2007 | Charles Bell et al. |
| 7,296,025 B2 | 11/2007 | Kung et al. |
| 7,346,778 B1 | 3/2008 | Guiter et al. |
| 7,353,252 B1 | 4/2008 | Yang et al. |
| 7,362,868 B2 | 4/2008 | Madoukh et al. |
| 7,363,330 B1 | 4/2008 | Ellman et al. |
| 7,370,269 B1 | 5/2008 | Prabhu et al. |
| 7,386,535 B1 | 6/2008 | Kalucha et al. |
| 7,401,117 B2 | 7/2008 | Dan et al. |
| 7,543,000 B2 | 6/2009 | Castro et al. |
| 7,581,221 B2 | 8/2009 | Lai et al. |
| 7,620,565 B2 | 11/2009 | Abelow |
| 7,647,559 B2 | 1/2010 | Yozell-Epstein et al. |
| 7,650,367 B1 | 1/2010 | Arruza |
| 7,661,088 B2 | 2/2010 | Burke |
| 7,665,093 B2 | 2/2010 | Maybee et al. |
| 7,676,542 B2 | 3/2010 | Moser et al. |
| 7,698,363 B2 | 4/2010 | Dan et al. |
| 7,734,600 B1 | 6/2010 | Wise et al. |
| 7,756,843 B1 | 7/2010 | Palmer |
| 7,774,412 B1 | 8/2010 | Schnepel |
| 7,814,426 B2 | 10/2010 | Huesken et al. |
| 7,886,287 B1 | 2/2011 | Davda |
| 7,886,295 B2 | 2/2011 | Burger et al. |
| 7,890,964 B2 | 2/2011 | Vogler-Ivashchanka et al. |
| 7,937,663 B2 | 5/2011 | Parker et al. |
| 7,958,353 B2 | 6/2011 | Matsuzaki et al. |
| 7,958,453 B1 | 6/2011 | Taing |
| 7,979,296 B2 | 7/2011 | Kruse et al. |
| 7,996,374 B1 | 8/2011 | Jones et al. |
| 8,027,976 B1 | 9/2011 | Ding et al. |
| RE42,904 E | 11/2011 | Stephens, Jr. |
| 8,065,739 B1 | 11/2011 | Bruening et al. |
| 8,090,361 B2 | 1/2012 | Hagan |
| 8,103,662 B2 | 1/2012 | Eagan et al. |
| 8,117,261 B2 | 2/2012 | Briere et al. |
| 8,140,513 B2 | 3/2012 | Ghods et al. |
| 8,151,183 B2 | 4/2012 | Chen et al. |
| 8,185,830 B2 | 5/2012 | Saha et al. |
| 8,200,582 B1 | 6/2012 | Zhu |
| 8,214,747 B1 | 7/2012 | Yankovich et al. |
| 8,224,934 B1 | 7/2012 | Dongre et al. |
| 8,230,348 B2 | 7/2012 | Peters et al. |
| 8,239,918 B1 | 8/2012 | Cohen |
| 8,326,814 B2 | 12/2012 | Ghods et al. |
| 8,347,276 B2 | 1/2013 | Schadow |
| 8,358,701 B2 | 1/2013 | Chou et al. |
| 8,370,803 B1 | 2/2013 | Holler et al. |
| 8,429,540 B1 | 4/2013 | Yankovich et al. |
| 8,464,161 B2 | 6/2013 | Giles et al. |
| 8,515,902 B2 | 8/2013 | Savage |
| 8,549,066 B1 | 10/2013 | Donahue et al. |
| 8,549,511 B2 | 10/2013 | Seki et al. |
| 8,582,777 B2 | 11/2013 | Urivskiy et al. |
| 8,583,619 B2 | 11/2013 | Ghods et al. |
| 8,607,306 B1 | 12/2013 | Bridge et al. |
| 8,620,578 B1 | 12/2013 | Brown et al. |
| 8,650,498 B1 | 2/2014 | Mihovilovic |
| 8,719,445 B2 | 5/2014 | Ko |
| 8,745,267 B2 | 6/2014 | Luecke et al. |
| 8,825,597 B1 | 9/2014 | Houston et al. |
| 8,868,574 B2 | 10/2014 | Kiang et al. |
| 8,892,679 B1 | 11/2014 | Destagnol et al. |
| 8,914,856 B1 | 12/2014 | Velummylum et al. |
| 8,914,900 B2 | 12/2014 | Smith et al. |
| 8,918,387 B1 | 12/2014 | Sokolov |
| 8,949,939 B2 | 2/2015 | Peddada |
| 8,959,579 B2 | 2/2015 | Barton et al. |
| 8,966,062 B1 | 2/2015 | Giese et al. |
| 8,990,955 B2 | 3/2015 | Hymel et al. |
| 9,019,123 B2 | 4/2015 | Boulanger et al. |
| 9,021,099 B2 | 4/2015 | Ko |
| 9,027,108 B2 | 5/2015 | Tan et al. |
| 9,037,870 B1 | 5/2015 | Zheng et al. |
| 9,054,919 B2 | 6/2015 | Kiang et al. |
| 9,117,087 B2 | 8/2015 | Tan et al. |
| 9,135,462 B2 | 9/2015 | Scharf et al. |
| 9,195,519 B2 | 11/2015 | Tan et al. |
| 9,280,613 B2 | 3/2016 | Smith et al. |
| 9,413,587 B2 | 8/2016 | Smith et al. |
| 9,450,926 B2 | 9/2016 | Scharf et al. |
| 2001/0027492 A1 | 10/2001 | Gupta |
| 2002/0029218 A1 | 3/2002 | Bentley et al. |
| 2002/0062218 A1 | 5/2002 | Pianin |
| 2002/0091738 A1 | 7/2002 | Rohrabaugh et al. |
| 2002/0099772 A1 | 7/2002 | Deshpande et al. |
| 2002/0116544 A1 | 8/2002 | Barnard et al. |
| 2002/0133509 A1 | 9/2002 | Johnston et al. |
| 2002/0147770 A1 | 10/2002 | Tang |
| 2002/0194177 A1 | 12/2002 | Sherman et al. |
| 2003/0041095 A1 | 2/2003 | Konda et al. |
| 2003/0046572 A1 | 3/2003 | Newman et al. |
| 2003/0084306 A1 | 5/2003 | Abburi et al. |
| 2003/0093404 A1 | 5/2003 | Bader et al. |
| 2003/0108052 A1 | 6/2003 | Inoue et al. |
| 2003/0110264 A1 | 6/2003 | Whidby et al. |
| 2003/0115326 A1 | 6/2003 | Verma et al. |
| 2003/0135536 A1 | 7/2003 | Lyons |
| 2003/0135565 A1 | 7/2003 | Estrada |
| 2003/0154306 A1 | 8/2003 | Perry |
| 2003/0204490 A1 | 10/2003 | Kasriel |
| 2003/0217171 A1 | 11/2003 | Von Stuermer et al. |
| 2003/0228015 A1 | 12/2003 | Futa et al. |
| 2004/0021686 A1 | 2/2004 | Barberis |

(56) References Cited

U.S. PATENT DOCUMENTS

| | | |
|---|---|---|
| 2004/0088647 A1 | 5/2004 | Miller et al. |
| 2004/0098361 A1 | 5/2004 | Peng |
| 2004/0103147 A1 | 5/2004 | Flesher et al. |
| 2004/0111415 A1 | 6/2004 | Scardino et al. |
| 2004/0117438 A1 | 6/2004 | Considine et al. |
| 2004/0122949 A1 | 6/2004 | Zmudzinski et al. |
| 2004/0128359 A1 | 7/2004 | Horvitz et al. |
| 2004/0177138 A1 | 9/2004 | Salle et al. |
| 2004/0181579 A1 | 9/2004 | Huck et al. |
| 2004/0196307 A1 | 10/2004 | Zak et al. |
| 2004/0201604 A1 | 10/2004 | Kraenzel et al. |
| 2004/0218214 A1 | 11/2004 | Kihara et al. |
| 2004/0230624 A1 | 11/2004 | Frolund et al. |
| 2004/0246532 A1 | 12/2004 | Inada |
| 2004/0267836 A1 | 12/2004 | Armangau et al. |
| 2005/0005276 A1 | 1/2005 | Morgan |
| 2005/0010860 A1 | 1/2005 | Weiss et al. |
| 2005/0022229 A1 | 1/2005 | Gabriel et al. |
| 2005/0028006 A1 | 2/2005 | Leser et al. |
| 2005/0038997 A1 | 2/2005 | Kojima et al. |
| 2005/0050228 A1 | 3/2005 | Perham et al. |
| 2005/0063083 A1 | 3/2005 | Dart et al. |
| 2005/0097225 A1 | 5/2005 | Glatt et al. |
| 2005/0102328 A1 | 5/2005 | Ring et al. |
| 2005/0108406 A1 | 5/2005 | Lee et al. |
| 2005/0114305 A1 | 5/2005 | Haynes et al. |
| 2005/0114378 A1 | 5/2005 | Elien et al. |
| 2005/0138118 A1 | 6/2005 | Banatwala et al. |
| 2005/0182966 A1 | 8/2005 | Pham et al. |
| 2005/0198299 A1 | 9/2005 | Beck et al. |
| 2005/0198452 A1 | 9/2005 | Watanabe |
| 2005/0234864 A1 | 10/2005 | Shapiro |
| 2005/0234943 A1 | 10/2005 | Clarke |
| 2005/0239447 A1* | 10/2005 | Holzman .............. H04L 63/08 455/414.3 |
| 2005/0261933 A1 | 11/2005 | Magnuson |
| 2005/0283800 A1 | 12/2005 | Ellis et al. |
| 2006/0005163 A1 | 1/2006 | Huesken et al. |
| 2006/0026502 A1 | 2/2006 | Dutta |
| 2006/0026535 A1 | 2/2006 | Hotelling et al. |
| 2006/0036568 A1 | 2/2006 | Moore et al. |
| 2006/0041603 A1 | 2/2006 | Paterson et al. |
| 2006/0041752 A1 | 2/2006 | Tuvell et al. |
| 2006/0047804 A1 | 3/2006 | Fredricksen et al. |
| 2006/0053088 A1 | 3/2006 | Ali et al. |
| 2006/0053380 A1 | 3/2006 | Spataro et al. |
| 2006/0070083 A1 | 3/2006 | Brunswig et al. |
| 2006/0075071 A1 | 4/2006 | Gillette |
| 2006/0093150 A1 | 5/2006 | Reddy et al. |
| 2006/0095526 A1 | 5/2006 | Levergood et al. |
| 2006/0117247 A1 | 6/2006 | Fite et al. |
| 2006/0123062 A1 | 6/2006 | Bobbitt et al. |
| 2006/0133340 A1 | 6/2006 | Rybak et al. |
| 2006/0168550 A1 | 7/2006 | Muller et al. |
| 2006/0174051 A1 | 8/2006 | Lordi et al. |
| 2006/0174054 A1 | 8/2006 | Matsuki |
| 2006/0179070 A1 | 8/2006 | George et al. |
| 2006/0179309 A1 | 8/2006 | Cross et al. |
| 2006/0242204 A1 | 10/2006 | Karas et al. |
| 2006/0242206 A1 | 10/2006 | Brezak et al. |
| 2006/0259524 A1 | 11/2006 | Horton |
| 2006/0265719 A1 | 11/2006 | Astl et al. |
| 2006/0271510 A1 | 11/2006 | Harward et al. |
| 2006/0288043 A1 | 12/2006 | Novak et al. |
| 2007/0011261 A1* | 1/2007 | Madams .............. H04L 12/58 709/207 |
| 2007/0016680 A1 | 1/2007 | Burd et al. |
| 2007/0038934 A1 | 2/2007 | Fellman |
| 2007/0050635 A1* | 3/2007 | Popp .............. H04L 9/0863 713/185 |
| 2007/0067349 A1 | 3/2007 | Jhaveri et al. |
| 2007/0079242 A1 | 4/2007 | Jolley et al. |
| 2007/0100830 A1 | 5/2007 | Beedubail et al. |
| 2007/0115845 A1 | 5/2007 | Hochwarth et al. |
| 2007/0118598 A1 | 5/2007 | Bedi et al. |
| 2007/0124460 A1 | 5/2007 | McMullen et al. |
| 2007/0124737 A1 | 5/2007 | Wensley et al. |
| 2007/0124781 A1 | 5/2007 | Casey et al. |
| 2007/0126635 A1 | 6/2007 | Houri |
| 2007/0130143 A1 | 6/2007 | Zhang et al. |
| 2007/0130163 A1 | 6/2007 | Perez et al. |
| 2007/0162610 A1 | 7/2007 | Un et al. |
| 2007/0192630 A1 | 8/2007 | Crane et al. |
| 2007/0198609 A1 | 8/2007 | Black et al. |
| 2007/0208878 A1 | 9/2007 | Barnes-Leon et al. |
| 2007/0214180 A1 | 9/2007 | Crawford |
| 2007/0220016 A1 | 9/2007 | Estrada et al. |
| 2007/0220590 A1 | 9/2007 | Rasmussen et al. |
| 2007/0240057 A1 | 10/2007 | Satterfield et al. |
| 2007/0250762 A1 | 10/2007 | Mansfield |
| 2007/0256065 A1 | 11/2007 | Heishi et al. |
| 2007/0266304 A1 | 11/2007 | Fletcher et al. |
| 2007/0282848 A1 | 12/2007 | Kiilerich et al. |
| 2007/0283443 A1 | 12/2007 | McPherson et al. |
| 2007/0288290 A1 | 12/2007 | Motoyama et al. |
| 2008/0005135 A1 | 1/2008 | Muthukrishnan et al. |
| 2008/0005195 A1 | 1/2008 | Li |
| 2008/0016146 A1 | 1/2008 | Gan et al. |
| 2008/0021959 A1 | 1/2008 | Naghi et al. |
| 2008/0028323 A1 | 1/2008 | Rosen et al. |
| 2008/0040173 A1 | 2/2008 | Aleong et al. |
| 2008/0040503 A1 | 2/2008 | Kleks et al. |
| 2008/0046828 A1 | 2/2008 | Bibliowicz et al. |
| 2008/0059656 A1 | 3/2008 | Saliba et al. |
| 2008/0063210 A1 | 3/2008 | Goodman et al. |
| 2008/0065881 A1 | 3/2008 | Dawson et al. |
| 2008/0077631 A1 | 3/2008 | Petri |
| 2008/0091763 A1 | 4/2008 | Devonshire et al. |
| 2008/0091790 A1 | 4/2008 | Beck |
| 2008/0104277 A1 | 5/2008 | Tian |
| 2008/0114720 A1 | 5/2008 | Smith et al. |
| 2008/0133674 A1 | 6/2008 | Knauerhase et al. |
| 2008/0140732 A1 | 6/2008 | Wilson et al. |
| 2008/0147790 A1 | 6/2008 | Malaney et al. |
| 2008/0151817 A1 | 6/2008 | Fitchett et al. |
| 2008/0154873 A1 | 6/2008 | Redlich et al. |
| 2008/0182628 A1 | 7/2008 | Lee et al. |
| 2008/0183467 A1 | 7/2008 | Yuan et al. |
| 2008/0184130 A1 | 7/2008 | Tien et al. |
| 2008/0194239 A1 | 8/2008 | Hagan |
| 2008/0215883 A1 | 9/2008 | Fok et al. |
| 2008/0222654 A1 | 9/2008 | Xu et al. |
| 2008/0243855 A1 | 10/2008 | Prahlad et al. |
| 2008/0250333 A1 | 10/2008 | Reeves et al. |
| 2008/0250348 A1 | 10/2008 | Alimpich et al. |
| 2008/0263099 A1 | 10/2008 | Brady-Kalnay et al. |
| 2008/0271095 A1 | 10/2008 | Shafton |
| 2008/0276158 A1 | 11/2008 | Lim et al. |
| 2008/0294899 A1 | 11/2008 | Gazzetta et al. |
| 2009/0015864 A1 | 1/2009 | Hasegawa |
| 2009/0019093 A1 | 1/2009 | Brodersen et al. |
| 2009/0019426 A1 | 1/2009 | Baeumer et al. |
| 2009/0030710 A1 | 1/2009 | Levine |
| 2009/0043848 A1 | 2/2009 | Kordun |
| 2009/0044128 A1 | 2/2009 | Baumgarten et al. |
| 2009/0049131 A1 | 2/2009 | Lyle et al. |
| 2009/0119322 A1 | 5/2009 | Mills et al. |
| 2009/0125469 A1 | 5/2009 | McDonald et al. |
| 2009/0132651 A1 | 5/2009 | Roger et al. |
| 2009/0138808 A1 | 5/2009 | Moromisato et al. |
| 2009/0150417 A1 | 6/2009 | Ghods et al. |
| 2009/0150627 A1 | 6/2009 | Benhase et al. |
| 2009/0158142 A1 | 6/2009 | Arthursson et al. |
| 2009/0164438 A1 | 6/2009 | Delacruz |
| 2009/0171983 A1 | 7/2009 | Samji et al. |
| 2009/0177754 A1 | 7/2009 | Brezina et al. |
| 2009/0193107 A1 | 7/2009 | Srinivasan et al. |
| 2009/0193345 A1 | 7/2009 | Wensley et al. |
| 2009/0198772 A1 | 8/2009 | Kim et al. |
| 2009/0210459 A1 | 8/2009 | Nair et al. |
| 2009/0214115 A1 | 8/2009 | Kimura et al. |
| 2009/0235167 A1 | 9/2009 | Boyer et al. |
| 2009/0235181 A1 | 9/2009 | Saliba et al. |
| 2009/0235189 A1 | 9/2009 | Aybes et al. |

(56) References Cited

U.S. PATENT DOCUMENTS

| | | |
|---|---|---|
| 2009/0249224 A1 | 10/2009 | Davis et al. |
| 2009/0254589 A1 | 10/2009 | Nair et al. |
| 2009/0260060 A1 | 10/2009 | Smith et al. |
| 2009/0265430 A1 | 10/2009 | Bechtel et al. |
| 2009/0271708 A1 | 10/2009 | Peters et al. |
| 2009/0276771 A1 | 11/2009 | Nickolov et al. |
| 2009/0282212 A1 | 11/2009 | Peterson |
| 2009/0282483 A1 | 11/2009 | Bennett |
| 2009/0300356 A1 | 12/2009 | Crandell |
| 2009/0300527 A1 | 12/2009 | Malcolm et al. |
| 2009/0327358 A1 | 12/2009 | Lukiyanov et al. |
| 2009/0327405 A1 | 12/2009 | Fitzgerald et al. |
| 2009/0327961 A1 | 12/2009 | De Vorchik et al. |
| 2010/0011292 A1 | 1/2010 | Marinkovich et al. |
| 2010/0011447 A1 | 1/2010 | Jothimani |
| 2010/0017262 A1 | 1/2010 | Iyer et al. |
| 2010/0017619 A1 | 1/2010 | Errico |
| 2010/0036929 A1 | 2/2010 | Scherpa et al. |
| 2010/0042720 A1 | 2/2010 | Stienhans et al. |
| 2010/0057560 A1 | 3/2010 | Skudlark et al. |
| 2010/0057785 A1 | 3/2010 | Khosravy et al. |
| 2010/0076946 A1 | 3/2010 | Barker et al. |
| 2010/0082634 A1 | 4/2010 | Leban |
| 2010/0083136 A1 | 4/2010 | Komine et al. |
| 2010/0088150 A1 | 4/2010 | Mazhar et al. |
| 2010/0092126 A1 | 4/2010 | Kaliszek et al. |
| 2010/0093310 A1 | 4/2010 | Gbadegesin et al. |
| 2010/0107225 A1 | 4/2010 | Spencer et al. |
| 2010/0131868 A1 | 5/2010 | Chawla et al. |
| 2010/0151431 A1 | 6/2010 | Miller |
| 2010/0153835 A1 | 6/2010 | Xiong et al. |
| 2010/0162365 A1 | 6/2010 | Del Real |
| 2010/0162374 A1 | 6/2010 | Nair |
| 2010/0179940 A1 | 7/2010 | Gilder et al. |
| 2010/0185463 A1 | 7/2010 | Noland et al. |
| 2010/0185932 A1 | 7/2010 | Coffman et al. |
| 2010/0191689 A1 | 7/2010 | Cortes et al. |
| 2010/0198783 A1 | 8/2010 | Wang et al. |
| 2010/0198871 A1 | 8/2010 | Stiegler et al. |
| 2010/0198944 A1 | 8/2010 | Ho et al. |
| 2010/0205537 A1 | 8/2010 | Knighton et al. |
| 2010/0218237 A1 | 8/2010 | Ferris et al. |
| 2010/0223378 A1 | 9/2010 | Wei |
| 2010/0229085 A1 | 9/2010 | Nelson et al. |
| 2010/0235526 A1 | 9/2010 | Carter et al. |
| 2010/0235539 A1 | 9/2010 | Carter et al. |
| 2010/0241611 A1 | 9/2010 | Zuber |
| 2010/0241972 A1 | 9/2010 | Spataro et al. |
| 2010/0250120 A1 | 9/2010 | Waupotitsch et al. |
| 2010/0251340 A1 | 9/2010 | Martin et al. |
| 2010/0257457 A1 | 10/2010 | De Goes |
| 2010/0262582 A1 | 10/2010 | Garcia-Ascanio et al. |
| 2010/0267588 A1 | 10/2010 | Nelson et al. |
| 2010/0274765 A1 | 10/2010 | Murphy et al. |
| 2010/0274772 A1 | 10/2010 | Samuels |
| 2010/0281118 A1 | 11/2010 | Donahue et al. |
| 2010/0290623 A1 | 11/2010 | Banks et al. |
| 2010/0306379 A1 | 12/2010 | Ferris |
| 2010/0306547 A1 | 12/2010 | Fallows et al. |
| 2010/0318893 A1 | 12/2010 | Matthews et al. |
| 2010/0322252 A1 | 12/2010 | Suganthi et al. |
| 2010/0325155 A1 | 12/2010 | Skinner et al. |
| 2010/0325527 A1 | 12/2010 | Estrada et al. |
| 2010/0325559 A1 | 12/2010 | Westerinen et al. |
| 2010/0325655 A1 | 12/2010 | Perez |
| 2010/0332401 A1 | 12/2010 | Prahlad et al. |
| 2010/0332962 A1 | 12/2010 | Hammer et al. |
| 2010/0333116 A1 | 12/2010 | Prahlad et al. |
| 2011/0001763 A1 | 1/2011 | Murakami |
| 2011/0016409 A1 | 1/2011 | Grosz et al. |
| 2011/0022559 A1 | 1/2011 | Andersen et al. |
| 2011/0022812 A1 | 1/2011 | van der Linden et al. |
| 2011/0029883 A1 | 2/2011 | Lussier et al. |
| 2011/0040812 A1 | 2/2011 | Phillips |
| 2011/0041083 A1 | 2/2011 | Gabai et al. |
| 2011/0047413 A1 | 2/2011 | McGill et al. |
| 2011/0047484 A1 | 2/2011 | Mount et al. |
| 2011/0052155 A1 | 3/2011 | Desmarais et al. |
| 2011/0054968 A1 | 3/2011 | Galaviz |
| 2011/0055299 A1 | 3/2011 | Phillips |
| 2011/0055721 A1 | 3/2011 | Jain et al. |
| 2011/0061045 A1 | 3/2011 | Phillips |
| 2011/0061046 A1 | 3/2011 | Phillips |
| 2011/0065082 A1 | 3/2011 | Gal et al. |
| 2011/0066951 A1 | 3/2011 | Ward-Karet et al. |
| 2011/0083167 A1 | 4/2011 | Carpenter et al. |
| 2011/0093567 A1 | 4/2011 | Jeon et al. |
| 2011/0099006 A1 | 4/2011 | Sundararaman et al. |
| 2011/0107088 A1 | 5/2011 | Eng et al. |
| 2011/0107205 A1 | 5/2011 | Chow et al. |
| 2011/0113320 A1 | 5/2011 | Neff et al. |
| 2011/0119313 A1 | 5/2011 | Sung et al. |
| 2011/0125847 A1 | 5/2011 | Cocheu et al. |
| 2011/0131299 A1 | 6/2011 | Sardary |
| 2011/0137991 A1 | 6/2011 | Russell |
| 2011/0142410 A1 | 6/2011 | Ishii |
| 2011/0145589 A1 | 6/2011 | Camenisch et al. |
| 2011/0145744 A1 | 6/2011 | Haynes et al. |
| 2011/0154180 A1 | 6/2011 | Evanitsky et al. |
| 2011/0154231 A1 | 6/2011 | Cherdron et al. |
| 2011/0161289 A1 | 6/2011 | Pei et al. |
| 2011/0167125 A1 | 7/2011 | Achlioptas |
| 2011/0167353 A1 | 7/2011 | Grosz et al. |
| 2011/0167435 A1 | 7/2011 | Fang |
| 2011/0185292 A1 | 7/2011 | Chawla et al. |
| 2011/0197156 A1 | 8/2011 | Strait et al. |
| 2011/0202424 A1 | 8/2011 | Chun et al. |
| 2011/0202599 A1 | 8/2011 | Yuan et al. |
| 2011/0207436 A1* | 8/2011 | van Gent ............ G06F 17/3089 455/413 |
| 2011/0208958 A1 | 8/2011 | Stuedi et al. |
| 2011/0209064 A1 | 8/2011 | Jorgensen et al. |
| 2011/0213765 A1 | 9/2011 | Cui et al. |
| 2011/0225417 A1 | 9/2011 | Maharajh et al. |
| 2011/0238458 A1 | 9/2011 | Purcell et al. |
| 2011/0238621 A1 | 9/2011 | Agrawal |
| 2011/0238759 A1 | 9/2011 | Spataro et al. |
| 2011/0239135 A1 | 9/2011 | Spataro et al. |
| 2011/0246294 A1 | 10/2011 | Robb et al. |
| 2011/0246950 A1 | 10/2011 | Luna et al. |
| 2011/0252320 A1 | 10/2011 | Arrasvuori et al. |
| 2011/0252339 A1 | 10/2011 | Lemonik et al. |
| 2011/0258461 A1 | 10/2011 | Bates |
| 2011/0258561 A1 | 10/2011 | Ladouceur et al. |
| 2011/0277027 A1 | 11/2011 | Hayton et al. |
| 2011/0282710 A1 | 11/2011 | Akkiraju et al. |
| 2011/0289433 A1 | 11/2011 | Whalin et al. |
| 2011/0296022 A1 | 12/2011 | Ferris et al. |
| 2011/0313803 A1 | 12/2011 | Friend et al. |
| 2011/0320197 A1 | 12/2011 | Conejero et al. |
| 2012/0036370 A1 | 2/2012 | Lim et al. |
| 2012/0057696 A1 | 3/2012 | Chew |
| 2012/0064879 A1 | 3/2012 | Panei |
| 2012/0072436 A1 | 3/2012 | Pierre et al. |
| 2012/0079095 A1 | 3/2012 | Evans et al. |
| 2012/0089659 A1 | 4/2012 | Halevi et al. |
| 2012/0096521 A1 | 4/2012 | Peddada |
| 2012/0110005 A1 | 5/2012 | Kuo et al. |
| 2012/0110436 A1 | 5/2012 | Adler, III et al. |
| 2012/0110443 A1 | 5/2012 | Lemonik et al. |
| 2012/0117626 A1 | 5/2012 | Yates et al. |
| 2012/0124306 A1 | 5/2012 | Abercrombie et al. |
| 2012/0124547 A1 | 5/2012 | Halbedel |
| 2012/0130900 A1 | 5/2012 | Tang et al. |
| 2012/0134491 A1 | 5/2012 | Liu |
| 2012/0136936 A1 | 5/2012 | Quintuna |
| 2012/0144283 A1 | 6/2012 | Hill et al. |
| 2012/0150888 A1 | 6/2012 | Hyatt et al. |
| 2012/0151551 A1 | 6/2012 | Readshaw et al. |
| 2012/0158908 A1 | 6/2012 | Luna et al. |
| 2012/0159178 A1 | 6/2012 | Lin et al. |
| 2012/0159310 A1 | 6/2012 | Chang et al. |
| 2012/0166516 A1 | 6/2012 | Simmons et al. |
| 2012/0173612 A1 | 7/2012 | Vegesna-Venkata et al. |

(56) References Cited

U.S. PATENT DOCUMENTS

| | | |
|---|---|---|
| 2012/0173625 A1 | 7/2012 | Berger |
| 2012/0179981 A1 | 7/2012 | Whalin et al. |
| 2012/0185355 A1 | 7/2012 | Kilroy |
| 2012/0185913 A1 | 7/2012 | Martinez et al. |
| 2012/0192055 A1 | 7/2012 | Antebi et al. |
| 2012/0192086 A1 | 7/2012 | Ghods et al. |
| 2012/0203670 A1 | 8/2012 | Piersol |
| 2012/0203908 A1 | 8/2012 | Beaty et al. |
| 2012/0204032 A1 | 8/2012 | Wilkins et al. |
| 2012/0214444 A1 | 8/2012 | McBride et al. |
| 2012/0218885 A1 | 8/2012 | Abel et al. |
| 2012/0221789 A1 | 8/2012 | Felter |
| 2012/0224691 A1 | 9/2012 | Purohit |
| 2012/0226767 A1 | 9/2012 | Luna et al. |
| 2012/0233155 A1 | 9/2012 | Gallmeier et al. |
| 2012/0233205 A1 | 9/2012 | McDermott |
| 2012/0233543 A1 | 9/2012 | Vagell et al. |
| 2012/0240061 A1 | 9/2012 | Hillenius et al. |
| 2012/0240183 A1 | 9/2012 | Sinha |
| 2012/0257249 A1 | 10/2012 | Natarajan |
| 2012/0259964 A1 | 10/2012 | Lin et al. |
| 2012/0263166 A1 | 10/2012 | Cho et al. |
| 2012/0266203 A1 | 10/2012 | Elhadad et al. |
| 2012/0284290 A1 | 11/2012 | Keebler et al. |
| 2012/0284638 A1 | 11/2012 | Cutler et al. |
| 2012/0284664 A1 | 11/2012 | Zhao |
| 2012/0291011 A1 | 11/2012 | Quine |
| 2012/0296790 A1 | 11/2012 | Robb |
| 2012/0309540 A1 | 12/2012 | Holme et al. |
| 2012/0311157 A1 | 12/2012 | Erickson et al. |
| 2012/0317239 A1 | 12/2012 | Mulder et al. |
| 2012/0317487 A1 | 12/2012 | Lieb et al. |
| 2012/0328259 A1 | 12/2012 | Seibert, Jr. et al. |
| 2012/0331177 A1 | 12/2012 | Jensen |
| 2012/0331441 A1 | 12/2012 | Adamson |
| 2013/0007074 A1 | 1/2013 | Weicher |
| 2013/0007245 A1 | 1/2013 | Malik et al. |
| 2013/0007464 A1 | 1/2013 | Madden |
| 2013/0007471 A1 | 1/2013 | Grab et al. |
| 2013/0007894 A1 | 1/2013 | Dang et al. |
| 2013/0013560 A1 | 1/2013 | Goldberg et al. |
| 2013/0014023 A1 | 1/2013 | Lee et al. |
| 2013/0042106 A1 | 2/2013 | Persaud et al. |
| 2013/0055127 A1 | 2/2013 | Saito et al. |
| 2013/0067232 A1 | 3/2013 | Cheung et al. |
| 2013/0073403 A1 | 3/2013 | Tuchman et al. |
| 2013/0080919 A1 | 3/2013 | Kiang et al. |
| 2013/0110565 A1 | 5/2013 | Means, Jr. et al. |
| 2013/0117337 A1 | 5/2013 | Dunham |
| 2013/0117376 A1 | 5/2013 | Filman et al. |
| 2013/0124638 A1 | 5/2013 | Barreto et al. |
| 2013/0124984 A1 | 5/2013 | Kuspa |
| 2013/0138608 A1 | 5/2013 | Smith |
| 2013/0138615 A1 | 5/2013 | Gupta et al. |
| 2013/0159411 A1 | 6/2013 | Bowen |
| 2013/0159707 A1 | 6/2013 | Jogand-Coulomb et al. |
| 2013/0163289 A1 | 6/2013 | Kim et al. |
| 2013/0167253 A1 | 6/2013 | Seleznev et al. |
| 2013/0173916 A1 | 7/2013 | Sato |
| 2013/0185347 A1 | 7/2013 | Romano |
| 2013/0185558 A1 | 7/2013 | Seibert et al. |
| 2013/0191339 A1 | 7/2013 | Haden et al. |
| 2013/0198474 A1 | 8/2013 | Shaath |
| 2013/0198600 A1 | 8/2013 | Lockhart et al. |
| 2013/0212067 A1 | 8/2013 | Piasecki et al. |
| 2013/0212486 A1 | 8/2013 | Joshi et al. |
| 2013/0218978 A1 | 8/2013 | Weinstein et al. |
| 2013/0239049 A1 | 9/2013 | Perrodin et al. |
| 2013/0246901 A1 | 9/2013 | Massand |
| 2013/0246932 A1 | 9/2013 | Zaveri et al. |
| 2013/0262210 A1 | 10/2013 | Savage et al. |
| 2013/0262862 A1 | 10/2013 | Hartley |
| 2013/0268480 A1 | 10/2013 | Dorman |
| 2013/0268491 A1 | 10/2013 | Chung et al. |
| 2013/0275398 A1 | 10/2013 | Dorman et al. |
| 2013/0275429 A1 | 10/2013 | York et al. |
| 2013/0275509 A1 | 10/2013 | Micucci et al. |
| 2013/0282830 A1 | 10/2013 | Besen et al. |
| 2013/0305039 A1 | 11/2013 | Gauda |
| 2013/0311894 A1 | 11/2013 | Rexer et al. |
| 2013/0318586 A1 | 11/2013 | Smith et al. |
| 2013/0326344 A1 | 12/2013 | Masselle et al. |
| 2013/0347070 A1 | 12/2013 | Cairns et al. |
| 2014/0007205 A1 | 1/2014 | Oikonomou |
| 2014/0032489 A1 | 1/2014 | Hebbar et al. |
| 2014/0032616 A1 | 1/2014 | Nack |
| 2014/0033277 A1 | 1/2014 | Xiao et al. |
| 2014/0033291 A1 | 1/2014 | Liu |
| 2014/0052939 A1 | 2/2014 | Tseng et al. |
| 2014/0059217 A1 | 2/2014 | Pizurica |
| 2014/0068589 A1 | 3/2014 | Barak |
| 2014/0074629 A1 | 3/2014 | Rathod |
| 2014/0150023 A1 | 5/2014 | Gudorf et al. |
| 2014/0156373 A1 | 6/2014 | Roberts et al. |
| 2014/0172595 A1 | 6/2014 | Beddow et al. |
| 2014/0259190 A1 | 9/2014 | Kiang et al. |
| 2014/0270178 A1 | 9/2014 | Kiang et al. |
| 2014/0344456 A1 | 11/2014 | Buzbee et al. |
| 2014/0359286 A1 | 12/2014 | Wen et al. |
| 2015/0019723 A1 | 1/2015 | Kweon et al. |
| 2015/0200948 A1 | 7/2015 | Cairns et al. |
| 2015/0381587 A1 | 12/2015 | Scharf et al. |

FOREIGN PATENT DOCUMENTS

| | | |
|---|---|---|
| CN | 102264063 A | 11/2011 |
| EP | 0348614 A2 | 1/1990 |
| EP | 0921661 A2 | 6/1999 |
| EP | 1349088 | 10/2003 |
| EP | 1528746 A2 | 5/2005 |
| EP | 1933242 A1 | 6/2008 |
| EP | 2372574 A1 | 10/2011 |
| EP | 2610776 A2 | 7/2013 |
| GB | 2453924 A | 4/2009 |
| GB | 2471282 A | 12/2010 |
| JP | 09-101937 | 4/1997 |
| JP | 11-025059 | 1/1999 |
| JP | 2003273912 A | 9/2003 |
| JP | 2004310272 A | 11/2004 |
| JP | 09-269925 | 10/2007 |
| JP | 2008250944 A | 10/2008 |
| KR | 20020017444 A | 3/2002 |
| KR | 20040028036 A | 4/2004 |
| KR | 20050017674 A | 2/2005 |
| KR | 20060070306 A | 6/2006 |
| KR | 20060114871 A | 11/2006 |
| KR | 20070043353 A | 4/2007 |
| KR | 20070100477 A | 10/2007 |
| KR | 20100118836 A | 11/2010 |
| KR | 20110074096 A | 6/2011 |
| KR | 20110076831 A | 7/2011 |
| WO | WO-0007104 A1 | 2/2000 |
| WO | WO-0219128 A1 | 3/2002 |
| WO | WO-2004097681 A1 | 11/2004 |
| WO | WO-2006028850 A2 | 3/2006 |
| WO | WO-2007024438 A1 | 3/2007 |
| WO | WO-2007035637 A2 | 3/2007 |
| WO | WO-2007113573 A2 | 10/2007 |
| WO | WO-2008011142 A2 | 1/2008 |
| WO | WO-2008076520 A2 | 6/2008 |
| WO | WO-2011109416 A2 | 9/2011 |
| WO | WO-2012167272 A1 | 12/2012 |
| WO | WO-2013009328 A2 | 1/2013 |
| WO | WO-2013013217 A1 | 1/2013 |
| WO | WO-2013041763 A1 | 3/2013 |
| WO | WO-2013166520 | 11/2013 |

OTHER PUBLICATIONS

Extended Search Report for EP141509422, Applicant: Box, Inc. Mailed Aug. 26, 2014, 12 pages.

Search Report for EP 13189144.2 Applicant: Box, Inc. Mailed Sep. 1, 2014, 9 pages.

(56) References Cited

OTHER PUBLICATIONS

Exam Report for GB1312874.9 Applicant: Box, Inc. Mailed Sep. 26, 2014, 2 pages.
Exam Report for GB1415126.0 Applicant: Box, Inc. Mailed Oct. 2, 2014, 8 pages.
Exam Report for GB1415314.2 Applicant: Box, Inc. Mailed Oct. 7, 2014, 6 pages.
Exam Report for GB1309209.3 Applicant: Box, Inc. Mailed Oct. 7, 2014, 3 pages.
Exam Report for GB1315232.7 Applicant: Box, Inc. Mailed Oct. 9, 2014, 5 pages.
Exam Report for GB1318789.3 Applicant: Box, Inc. Mailed Oct. 30, 2014, 6 pages.
Microsoft Windows XP Professional Product Documentation: How Inheritance Affects File and Folder Permissions, Apr. 11, 2014, 2 pages.
Exam Report for GB1317393.5 Applicant: Box, Inc. Mailed Nov. 7, 2014, 6 pages.
Exam Report for GB1311417.8 Applicant: Box, Inc. Mailed Nov. 7, 2014, 2 pages.
Exam Report for GB1311421.0 Applicant: Box, Inc. Mailed Nov. 7, 2014, 4 pages.
Exam Report for GB1316682.2 Applicant: Box, Inc. Mailed Nov. 19, 2014, 6 pages.
Exam Report for GB1312095.1 Applicant: Box, Inc. Mailed Nov. 19, 2014, 5 pages.
Exam Report for GB1313559.5 Applicant: Box, Inc. Mailed Nov. 4, 2014, 2 pages.
"PaperPort Professional 14," PC Mag. Com review, published Feb. 2012, Ziff Davis, Inc., 8 pages.
"PaperPort," Wikipedia article (old revision), published May 19, 2012, Wikipedia Foundation, 2 pages.
"Quickoffice Enhances Android Mobile office Application for Improved Productivity on latest Smartphone and Table Devices," QuickOffice Press Release, Nov. 21, 2011, QuickOffice Inc., 2 pages.
"QuickOffice," Wikipedia Article (old revision), published May 9, 2012, Wikipedia Foundation, 2 pages.
Exam Report for EP13168784.0, Applicant: Box, Inc. Mailed Nov. 21, 2013, 7 pages.
Exam Report for GB1309209.3, Applicant: Box, Inc. Mailed Oct. 30, 2013, 11 pages.
Exam Report for GB1310666.1, Applicant: Box, Inc. Mailed Aug. 30, 2013, 10 pages.
Exam Report for GB1311417.8, Applicant: Box, Inc. Mailed Dec. 20, 2013, 5 pages.
Exam Report for GB1312095.1, Applicant: Box, Inc. Mailed Dec. 12, 2013, 7 pages.
Exam Report for GB1312874.9, Applicant: Box, Inc. Mailed Dec. 20, 2013, 11 pages.
Exam Report for GB1313559.5, Applicant: Box, Inc., Mailed Aug. 22, 2013, 19 pages.
Exam Report for GB1316532.9, Applicant: Box, Inc. Mailed Oct. 31, 2013, 10 pages.
Exam Report for GB1316533.7, Applicant: Box, Inc. Mailed Oct. 8, 2013, 9 pages.
Exam Report for GB1316971.9, Applicant: Box, Inc. Mailed Nov. 26, 2013, 10 pages.
Exam Report for GB1317600.3, Applicant: Box, Inc. Mailed Nov. 21, 2013, 8 pages.
Exam Report for GB1318373.6, Applicant: Box, Inc. Mailed Dec. 17, 2013, 4 pages.
Exam Report for GB1320902.8, Applicant: Box, Inc. Mailed Dec. 20, 2013, 4 pages.
Gedymin, "Cloud computing with an emphasis on Google App Engine," Master Final Project, Sep. 2011, 146 pages.
Google Docs, http://web.Archive.org/web/20100413105758/http://en.wikipedia.org/wiki/Google_docs, Apr. 13, 2010, 6 pages.
Patent Court Document of Approved Judgment for GB0602349.3 and GB0623571.7; Mar. 3, 2009, 17 pages.
User's Guide for SMART Board Software for Windows, published Dec. 2004, 90 pages.
Zambonini et al., "Automated Measuring of Interaction with User Interfaces," Published as WO2007113573 Oct. 2007, 19 pages.
Exam Report for GB1309209.3 Applicant: Box, Inc. Mailed Jan. 19, 2015, 6 pages.
"Agilewords—How to Request Approval," YouTube, http://www.youtube.com/watch?v=3-Ov3DYNN3Q, Jan. 31, 2011, 2 pages.
"Agilewords—Features, Powerful Features Yet Simple," Jun. 1, 2011, http://web.archive.org/web/20110601223756/http://agilewords.com/product/features, 3 pages.
Conner, "Google Apps: The Missing Manual," published by O'Reilly Media, May 27, 2008, 42 pages.
Exam Report for EP 13177108.1, Applicant: Box, Inc. Mailed Feb. 17, 2015, 6 pages.
Exam Report for GB1312264.3 Applicant: Box, Inc. Mailed Jan. 30, 2015, 5 pages.
Exam Report for GB1312874.9 Applicant: Box, Inc. Mailed Feb. 10, 2015, 7 pages.
Exam Report for GB1316685.5 Applicant: Box, Inc. Mailed Feb. 17, 2015, 5 pages.
Exam Report for EP 13185269.1, Applicant: Box, Inc. Mailed Feb. 13, 2015, 8 pages.
"Average Conversion Time for a D60 RAW file?" http://www.dpreview.com, Jul. 22, 2002, 4 pages.
Burns, "Developing Secure Mobile Applications for Android," Oct. 2008, Version 1.0, 1-28 pages.
Comes, "MediaXchange User's Manual," Version 1.15.15, Feb. 1, 2009, pp. 1-90.
Exam Report for EP13185269.1, Applicant: Box, Inc. Mailed Jan. 28, 7 pages.
Exam Report for GB1308842.2, Applicant: Box, Inc. Mailed Mar. 10, 2014, 4 pages.
Exam Report for GB1312264.3, Applicant: Box, Inc. Mailed Mar. 24, 2014, 7 pages.
Exam Report for GB1314771.5, Applicant: Box, Inc. Mailed Feb. 17, 2014, 7 pages.
International Search Report and Written Opinion for PCT/US2013/034765, Applicant: Box, Inc., Mailed Jan. 20, 2014, 15 pages.
John et al., "Always Sync Support Forums—View topic—Allway sync funny behavior," Allway Sync Support Forum at http://sync-center.com, Mar. 28, 2011, XP055109680, 2 pages.
Search Report for EP 11729851.3, Applicant: Box, Inc. Mailed Feb. 7, 2014, 9 pages.
Search Report for EP14151588.2, Applicant: Box, Inc. Mailed Apr. 15, 2014, 12 pages.
Search Report for EP14153783.7, Applicant: Box, Inc. Mailed Mar. 24, 2014, 7 pages.
Search Report for EP13187217.8, Applicant: Box, Inc. Mailed Apr. 15, 2014, 12 pages.
Rao, "Box Acquires Crocodoc To Add HTML5 Document Converter And Sleek Content Viewing Experience To Cloud Storage Platform," retrieved from the internet, http://techcrunch.com, May 9, 2013, 8 pages.
Walker, "PDF.js project meeting notes," retrieved from the internet, http://groups.google.com, May 15, 2014, 1 page.
Sommerer, "Presentable Document Format: Improved On-demand PDF to HTML Conversion," retrieved from the internet, http://research.microsoft.com, 8 pages.
"Tulsa TechFest 2012—Agenda," retrieved from the website, http://web.archive.org, Oct. 2, 2012, 2 pages.
Delendik, "Evolving with Web Standards—The Story of PDF.JS," retrieved from the internet, http://people.mozilla.org, Oct. 12, 2012, 36 pages.
Delendik, "My PDF.js talk slides from Tulsa TechFest," retrieved from the internet, http://twitter.com, Oct. 12, 2012, 2 pages.
Cohen, "Debating the Definition of Cloud Computing Platforms," retrieved from the internet, http://forbes.com, Feb. 3, 2014, 7 pages.
Partial Search Report for EP131832800, Applicant: Box, Inc. Mailed May 8, 2014, 5 pages.
Search Report for EP141509422, Applicant: Box, Inc. Mailed May 8, 2014, 7 pages.

(56) References Cited

OTHER PUBLICATIONS

Tulloch et al., "Windows Vista Resource Kit," Apr. 8, 2007, Microsoft Press, XP055113067, 6 pages.
"Revolving sync conflicts; frequently asked questions," Microsoft Tech Support, Jul. 16, 2012, retrieved from the Internet: http://web.archive.org/web, 2 pages.
Pyle et al., "How to enable Event logging for Offline Files (Client Side Caching) in Windows Vista," Feb. 18, 2009, retrieved from the internet: http://blogs.technet.com, 3 pages.
Duffy, "The Best File-Syncing Services," pcmag.com, retrieved from the internet: http://www.pcmag.com, Sep. 28, 2012, 7 pages.
"Troubleshoot sync problems," Microsoft Tech Support: May 2, 2012, retrieved from the internet, http://web. Archive.org/web, 3 pages.
Exam Report for GB1318792.7, Applicant: Box, Inc. Mailed May 22, 2014, 2 pages.
Exam Report for EP13177108.1, Applicant: Box, Inc. Mailed May 26, 2014, 6 pages.
Burney, "How to Move Document from Your Computer to Your iPad and Back Again," May 31, 2011, 3 pages.
"Dropbox: Sync only specific folders," posted on Feb. 9, 2012, available online at http://www.tech-recipes.com/rx/20865/dropbox-sync-only-specific-folders/, 4 pages.
No Stated Author, Amazon Simple Storage Services FAQs, 2012, https://web.archive.org.web/20120615092600/http://aws.amazon.com/s3/faqs/>; pp. 1-14.
Mogull, "DLP Content Discovery: Best Practices for Stored Data Discovery and Protection," 2009, pp. 1-16.
No Stated Author, "CheckPoint Virtual Appliance for Amazon Web Services," 2012, pp. 1-6.
Exam Report for GB1309209.3; Applicant: Box, Inc. Mailed Jul. 15, 2015, 8 pages.
"Conceptboard", One-Step Solution for Online Collaboration, retrieved from websites http://conceptboard.com and https://www.youtube.com/user/ConceptboardApp?feature=watch, printed on Jun. 13, 2013, 9 pages.
"How-to Geek, How to Sync Specific Folders With Dropbox," downloaded from the internet http://www.howtogeek.com, Apr. 23, 2013, 5 pages.
"Microsoft Office SharePoint 2007 User Guide," Feb. 16, 2010, pp. 1-48.
"Understanding Metadata," National Information Standards Organization, NISO Press, 2004, 20 pages.
Cisco, "FTP Load Balancing on ACE in Routed Mode Configuration Example," DocWiki, Jun. 2011, 7 pages.
Conner, "Google Apps: The Missing Manual," published by O'Reilly Media, May 27, 2008, 24 pages.
Exam Report for EP13158415.3, Applicant: Box, Inc. Mailed Jun. 4, 2013, 8 pages.
Exam Report for GB1300188.8, Applicant: Box, Inc. Mailed May 31, 2013, 8 pages.
Exam Report for GB1306011.6, Applicant: Box, Inc. Mailed Apr. 18, 2013, 8 pages.
International Search Report and Written Opinion for PCT/US2008/012973 dated Apr. 30, 2009, pp. 1-11.
International Search Report and Written Opinion for PCT/US2010/070366, Applicant: Box, Inc., Mailed Mar. 24, 2013, 10 pages.
International Search Report and Written Opinion for PCT/US2011/039126 mailed on Oct. 6, 2011, pp. 1-13.
International Search Report and Written Opinion for PCT/US2011/041308 Mailed Jul. 2, 2012, pp. 1-16.
International Search Report and Written Opinion for PCT/US2011/047530, Applicant: Box, Inc., Mailed Mar. 22, 2013, pp. 1-10.
International Search Report and Written Opinion for PCT/US2011/056472 mailed on Jun. 22, 2012, pp. 1-12.
International Search Report and Written Opinion for PCT/US2011/057938, Applicant: Box, Inc., Mailed Mar. 29, 2013, 10 pages.
International Search Report and Written Opinion for PCT/US2011/060875 Mailed Oct. 30, 2012, pp. 1-10.
International Search Report and Written Opinion for PCT/US2012/056955, Applicant: Box, Inc., Mailed Mar. 27, 2013, pp. 1-11.
International Search Report and Written Opinion for PCT/US2012/063041, Applicant: Box, Inc., Mailed Mar. 29, 2013, 12 pages.
International Search Report and Written Opinion for PCT/US2012/065617, Applicant: Box, Inc., Mailed Mar. 29, 2013, 9 pages.
International Search Report and Written Opinion for PCT/US2012/067126, Applicant: Box, Inc., Mailed Mar. 29, 2013, 10 pages.
International Search Report and Written Opinion for PCT/US2013/020267, Applicant: Box, Inc., Mailed May 7, 2013, 10 pages.
International Search Report and Written Opinion for PCT/US2013/023889, Applicant: Box, Inc., Mailed Jun. 24, 2013, 13 pages.
International Search Report and Written Opinion for PCT/US2013/029520, Applicant: Box, Inc., Mailed Jun. 26, 2013, 10 pages.
International Search Report and Written Opinion for PCT/US2013/034662, Applicant: Box, Inc., Mailed May 31, 2013, 10 pages.
International Search Report and Written Opinion for PCT/US2013/035404, Applicant: Box, Inc., Mailed Jun. 26, 2013, 13 pages.
Internet Forums, http://web.archive.org/web/20100528195550/http://en.wikipedia.org/wiki/Internet_forums, Wikipedia, May 30, 2010, pp. 1-20.
Langfeld L. et al., "Microsoft SharePoint 2003 Unleashed," Chapters 11 and 15, Jun. 2004, pp. 403-404, 557-561, 578-581.
Lars, "35 Very Useful Online Tools for Improving your project Management and Team Collaboration," Apr. 31, 2010, tripwiremagazine.com, pp. 1-32.
Palmer, "Load Balancing FTP Servers," BlogNav, Oct. 2008, 2 pages.
Parr, "Google Docs Improves Commenting, Adds E-mail Notifications," Apr. 16, 2011, mashable.com, pp. 1-6.
Partial International Search Report for PCT/US2011/041308 dated Feb. 27, 2012, pp. 1-2.
Supplementary European Search Report European Application No. EP 08 85 8563 dated Jun. 20, 2011 pp. 1-5.
Wayback, "Wayback machine," Wayback, Jun. 1, 2011, 1 page.
Wiki, http://web.archive.org/web/20100213004936/http://en.wikipedia.org/wiki/Wiki, Feb. 13, 2010, pp. 1-16.
Yahoo! Groups, http://web.archive.org/web/20090320101529/http://en.wikipedia.org/wiki/Yahoo!_Groups, Wikipedia, Mar. 20, 2009, pp. 1-6.
International Search Report and Written Opinion for PCT/US2013/039782, Applicant: Box, Inc., Mailed Aug. 28, 2013, 15 pages.
Exam Report for GB1410569.6 Applicant: Box, Inc. Mailed Jul. 11, 2014, 9 pages.
Sommerer, "Presentable Document Format: Improved On-demand PDF to HTML Conversion," retrieved from the internet, http://research.microsoft.com, Nov. 2004, 8 pages.
Exam Report for GB1311459.0, Applicant: Box, Inc., Mailed Aug. 19, 2013, 6 pages.
U.S. Appl. No. 13/776,535, filed Feb. 25, 2013 System Aand Method For Creating A Secure Channel For Inter-Application Communication Based On Intents.
Wei, et al., "Managing Security of Virtual Machine Images in a Cloud Environment," CCSW'09, Nov. 13, 2009, pp. 91-96.
Oberheide et al., "CloudAV: N-Version Antivirus in the Network Cloud," USENIX08, Jul. 2008, 16 pages.
U.S. Appl. No. 60/992,656, filed Dec. 5, 2007 Methods And Systems For Open Source Collaboration In An Application Service Provider Environment.
U.S. Appl. No. 61/055,901, filed May 23, 2008 Methods And Systems For Open Source Integration.
U.S. Appl. No. 12/260,533, filed Oct. 29, 2008 Methods and Systems for Open Source Integration.
U.S. Appl. No. 13/030,090, filed Feb. 17, 2011 Methods and Systems for Open Source Collaboration in an Application Service Provider Environment.
U.S. Appl. No. 13/412,549, filed Mar. 5, 2012 Methods And Systems For Open Source Collaboration In An Application Service Provider Environment.
U.S. Appl. No. 13/646,339, filed Oct. 5, 2012 File Management System And Collaboration Service And Integration Capabilities With Third Party Applications.

(56) References Cited

OTHER PUBLICATIONS

U.S. Appl. No. 14/073,502, filed Nov. 6, 2013 Methods And Systems For Open Source Collaboration In An Application Service Provider Environment.
U.S. Appl. No. 61/434,810, filed Jan. 20, 2011 Real Time Notifications Of Activity And Real-Time Collaboration In A Cloud-Based Environment With Applications In Enterprise Settings.
U.S. Appl. No. 13/152,982, filed Jun. 3, 2011 Real Time Notification of Activities that Occur in a Web-Based Collaboration Environment.
U.S. Appl. No. 13/166,733, filed Jun. 22, 2011 Multimedia Content Preview Rendering in a Cloud Content Management System.
U.S. Appl. No. 61/551,894, filed Oct. 26, 2011 Enhanced Multimedia Content Preview Rendering In A Cloud Content Management System.
U.S. Appl. No. 13/590,012, filed Aug. 20, 2012 Preview Pre-Generation Based On Heuristics And Algorithmic Prediciton/Assessment Of Predicted User Behavior For Enhancement Of User Experience.
U.S. Appl. No. 13/297,230, filed Nov. 15, 2011 Enhanced Multimedia Content Preview Rendering In A Cloud Content Management.
U.S. Appl. No. 61/592,567, filed Jan. 30, 2012 Preview Pre-Generation Based On Heuristics And Algorithmic Prediction/Assessment Of Predicted User Behavior For Enhancement Of User Experience.
U.S. Appl. No. 61/506,013, filed Jul. 8, 2011 Collaboration Sessions In A Workspace On A Cloud-Based Content Management System.
U.S. Appl. No. 13/208,615, filed Aug. 12, 2011 Collaboration Sessions in a Workspace on a Cloud-Based Content Management System.
U.S. Appl. No. 61/592,394, filed Jan. 30, 2012 Extended Applications Of Multimedia Content Previews In The Cloud-Based Content Management System.
U.S. Appl. No. 13/588,356, filed Aug. 17, 2012 Extended Applications Of Multimedia Content Previews In The Cloud-Based Content Management System.
U.S. Appl. No. 13/274,268, filed Oct. 14, 2011 Automatic And Semi-Automatic Tagging Features Of Work Items In A Shared Workspace For Metadata Tracking In A Cloud-Based Content Management System With Selective Or Optional User Contribution.
U.S. Appl. No. 13/968,357, filed Aug. 15, 2013 Automatic And Semi-Automatic Tagging Features Of Work Items In A Shared Workspace For Metadata Tracking In A Cloud-Based Content Management System With Selective Or Optional User Contribution.
U.S. Appl. No. 61/538,782, filed Sep. 23, 2011 Central Managament And Control Of User-Contributed Content In A Web-Based Collaboration Environment and Management Console Thereof.
U.S. Appl. No. 13/547,264, filed Jul. 12, 2012 Central Management And Control Of User-Contributed Content In A Web-Based Collaboration Environment And Management Console Thereof.
U.S. Appl. No. 13/165,725, filed Jun. 21, 2011 Batch Uploading of Content to a Web-Based Collaboration Environment.
U.S. Appl. No. 61/505,999, filed Jul. 11, 2011 Desktop Application for Access and Interaction with Workspaces in a Cloud-Based Content Management System and Synchronization Mechanisms Thereof.
U.S. Appl. No. 13/282,427, filed Oct. 26, 2011 Desktop Application for Access and Interaction with Workspaces in a Cloud-Based Content Management System and Synchronization Mechanisms Thereof.
U.S. Appl. No. 61/554,450, filed Nov. 1, 2011 Platform And Application Independent Method For Document Editing And Version Tracking Via A Web Browser.
U.S. Appl. No. 13/332,319, filed Dec. 20, 2011 Platform and Application Independent System And Method For Networked File Access And Editing.
U.S. Appl. No. 13/414,480, filed Mar. 7, 2012 Universal File Type Preview For Mobile Devices.

U.S. Appl. No. 61/564,425, filed Nov. 29, 2011 Mobile Platform Folder Synchronization And Offline Synchronization.
U.S. Appl. No. 61/568,430, filed Dec. 8, 2011 Mobile Platform File and Folder Selection Functionalities For Offline Access And Synchronization.
U.S. Appl. No. 13/689,544, filed Nov. 29, 2012 Mobile Platform File and Folder Selection Functionalities For Offline Access And Synchronization.
U.S. Appl. No. 13/345,502, filed Jan. 6, 2012 System And Method For Actionable Event Generation For Task Delegation And Management Via A Discussion Forum In A Web-Based Collaboration Environment.
U.S. Appl. No. 13/619,439, filed Sep. 14, 2012 Batching Notifications Of Activities That Occur In A Web-Based Collaboration Environment.
U.S. Appl. No. 61/560,685, filed Nov. 16, 2011 Temporal And Spatial Processing And Tracking Of Events In A Web-Based Collaboration Environment For Asynchronous Delivery In An Ordered Fashion.
U.S. Appl. No. 13/524,501, filed Jun. 15, 2012 Resource Effective Incremental Updating Of A Remote Client With Events Which Occurred Via A Cloud-Enabled Platform.
U.S. Appl. No. 13/526,437, filed Jun. 18, 2012 Managing Updated At Clients Used by A User To Access A Cloud-Based Collaboration Service.
U.S. Appl. No. 14/658,423, filed Mar. 16, 2015 Managing Updates At Clients Used By A User To Access A Cloud-Based Collaboration Service.
U.S. Appl. No. 61/579,551, filed Dec. 22, 2011 System Status Monitoring And Data Health Checking In A Collaborative Environment.
U.S. Appl. No. 13/464,813, filed Apr. 4, 2012 Health Check Services For Web-Based Collaboration Environments.
U.S. Appl. No. 14/643,720, filed Mar. 10, 2015 Health Check Services For Web-Based Collaboration Environments.
U.S. Appl. No. 13/405,164, filed Feb. 24, 2012 System And Method For Promoting Enterprise Adoption Of A Web-Based Collaboration Environment.
U.S. Appl. No. 13/431,645, filed Mar. 27, 2012 Cloud Service Or Storage Use Promotion Via Partnership Driven Automatic Account Upgrades.
U.S. Appl. No. 61/620,554, filed Apr. 5, 2012 Device Pinning Capability For Enterprise Cloud Service and Storage Accounts.
U.S. Appl. No. 13/493,922, filed Jun. 11, 2012 Device Pinning Capability For Enterprise Cloud Service and Storage Accounts.
U.S. Appl. No. 61/649,869, filed Mar. 21, 2012 Selective Application Access Control Via A Cloud-Based Service For Security Enhancement.
U.S. Appl. No. 13/493,783, filed Jun. 11, 2012 Security Enhancement Through Application Access Control.
U.S. Appl. No. 61/702,948, filed Sep. 19, 2012 Cloud-Based Platform Enabled With Media Content Indexed For Text-Based Searches And/Or Metadata Extraction.
U.S. Appl. No. 13/829,663, filed Mar. 14, 2013 Cloud-Based Platform Enabled With Media Content Indexed For Text-Based Searches And/Or Metadata Extraction.
U.S. Appl. No. 61/702,662, filed Sep. 18, 2012 Sandboxing Individual Applications To Specific User Folders In A Cloud-Based Service.
U.S. Appl. No. 13/830,016, filed Mar. 14, 2013 Sandboxing Individual Applications To Specific User Folders In A Cloud-Based Service.
U.S. Appl. No. 61/620,568, filed Apr. 5, 2012 Synchronization Client Selective Subfolder Syncing In A Cloud-Based Environment.
U.S. Appl. No. 13/856,607, filed Apr. 4, 2013 Method and Apparatus For Selective Subfolder Synchronization In A Cloud-Based Environment.
U.S. Appl. No. 61/622,868, filed Apr. 11, 2012 Web And Desktop Client Synchronization Of Mac Packages With A Cloud-Based Platform.
U.S. Appl. No. 13/618,993, filed Sep. 14, 2012 Cloud Service Enabled To Handle A Set Of Files Depicted To A User As A Single File In A Native Operating System.

(56) References Cited

OTHER PUBLICATIONS

U.S. Appl. No. 61/643,116, filed May 4, 2012 Hbase Redundancy Implementation For Action Log Framework.
U.S. Appl. No. 13/890,172, filed May 8, 2013 Repository Redundancy Implementation Of A System Which Incrementally Updates Clients With Events That Occurred Via A Cloud-Enabled Platform.
U.S. Appl. No. 13/888,308, filed May 6, 2013 Repository Redundancy Implementation Of A System Which Incrementally Updates Clients With Events That Occurred Via A Cloud-Enabled Platform.
U.S. Appl. No. 61/693,521, filed Aug. 27, 2012 Backend Implementation Of Synchronization Client Selective Subfolder Syncing In A Cloud-Based Environment.
U.S. Appl. No. 14/010,851, filed Aug. 27, 2013 Server Side Techniques For Reducing Database Workload In Implementing Selective Subfolder Synchronization In A Cloud-Based Environment.
U.S. Appl. No. 61/641,824, filed May 2, 2012 Platform And Application Agnostic Method For Seamless File Access In A Mobile Environment.
U.S. Appl. No. 61/650,840, filed May 23, 2012 Platform And Application Agnostic Method For Seamless File Access In A Mobile Environment.
U.S. Appl. No. 61/653,876, filed May 31, 2012 Platform And Application Agnostic Method For Seamless File Access In A Mobile Environment.
U.S. Appl. No. 13/886,147, filed May 2, 2013 System And Method For A Third-Party Application To Access Content Within A Cloud-Based Platform.
U.S. Appl. No. 13/897,421, filed May 19, 2013 Methods, Architectures And Security Mechanisms For A Third-Party Application To Access Content In A Cloud-Based Platform.
U.S. Appl. No. 13/898,200, filed May 20, 2013 Metadata Enabled Third-Party Application Access Of Content At A Cloud-Based Platform Via A Native Client To The Cloud-Based Platform.
U.S. Appl. No. 13/898,242, filed May 20, 2013 Identification Verification Mechanisms For A Third-Party Application To Access Content In A Cloud-Based Platform.
U.S. Appl. No. 61/667,909, filed Jul. 3, 2012 Highly Available Ftp Servers For A Cloud-Based Service.
U.S. Appl. No. 13/565,136, filed Aug. 2, 2012 Load Balancing Secure Ftp Connections Among Multiple Ftp Servers.
U.S. Appl. No. 13/649,784, filed Oct. 11, 2012 Highly Available Ftp Servers For A Cloud-Based Service.
U.S. Appl. No. 61/668,626, filed Jul. 6, 2012 Online Shard Migration.
U.S. Appl. No. 13/937,060, filed Jul. 8, 2013 System And Method For Performing Shard Migration To Support Functions Of A Cloud-Based Service.
U.S. Appl. No. 61/668,698, filed Jul. 6, 2012 Identification Of People As Search Results From Key-Word Based Searches Of Content.
U.S. Appl. No. 13/937,101, filed Jul. 8, 2013 Identification Of People As Search Results From Key-Word Based Searches of Content In A Cloud-Based Environment.
U.S. Appl. No. 61/673,671, filed Jul. 19, 2012 Data Loss Prevention Methods And Architectures In A Cloud Service.
U.S. Appl. No. 13/944,184, filed Jul. 17, 2013 Data Loss Prevention (Dlp) Methods And Architectures By A Cloud Service.
U.S. Appl. No. 13/944,241, filed Jul. 17, 2013 Data Loss Prevention (Dlp) Methods By A Cloud Service Including Third Party Integration Architectures.
U.S. Appl. No. 61/694,492, filed Aug. 29, 2012 Method Of Streaming File Encryption And Decryption To/From A Collaborative Cloud.
U.S. Appl. No. 13/975,827, filed Aug. 26, 2013 Method Of Streaming File Encryption And Decryption To/From A Collaborative Cloud.
U.S. Appl. No. 61/701,823, filed Sep. 17, 2012 Use Of A Status Bar Interface Element As A Handle For Revealing Additional Details.
U.S. Appl. No. 13/737,577, filed Jan. 9, 2013 System And Method Of A Manipulative Handle In An Interactive Mobile User Interface.
U.S. Appl. No. 61/697,437, filed Sep. 6, 2012 Secure File Portability Between Mobile Applications Using A Server-Based Key Generation Service.
U.S. Appl. No. 13/776,358, filed Feb. 25, 2013 Secure File Portability Between Mobile Applications Using A Server-Based Key Generation Service.
U.S. Appl. No. 14/642,131, filed Mar. 9, 2015 Systems And Methods For Secure File Portability Between Mobile Applications On A Mobile Device.
U.S. Appl. No. 61/697,469, filed Sep. 6, 2012 Force Upgrade Of A Mobile Application Via Server Side Configuration Files.
U.S. Appl. No. 13/776,467, filed Feb. 25, 2013 Force Upgrade Of A Mobile Application Via Server Side Configuration File.
U.S. Appl. No. 61/697,477, filed Sep. 6, 2012 Disabling The Self-Referential Appearance Of A Mobile Application In An Intent Via A Background Registration.
U.S. Appl. No. 13/794,401, filed Mar. 11, 2013 Disabling The Self-Referential Appearance Of A Mobile Application In An Intent Via A Background Registration.
U.S. Appl. No. 61/697,511, filed Sep. 6, 2012 Channel For Opening And Editing Files From A Cloud Service Provider Based On Intents.
U.S. Appl. No. 13/776,535, filed Feb. 25, 2013 System And Method For Creating A Secure Channel For Inter-Application Communication Based On Intents.
U.S. Appl. No. 61/694,466, filed Aug. 12, 2012 Optimizations For Client And/Or Server Feedback Information Enabled Real Time Or Near Real Time Enhancement Of Upload/Download Performance.
U.S. Appl. No. 61/702,154, filed Sep. 17, 2012 Optimizations For Client And/Or Server Feedback Information Enabled Real Time Or Near Real Time Enhancement Of Upload/Download Performance.
U.S. Appl. No. 61/703,699, filed Sep. 20, 2012 Optimizations For Client And/Or Server Feedback Information Enabled Real Time Or Near Real Time Enhancement Of Upload/Download Performance.
U.S. Appl. No. 13/969,474, filed Aug. 16, 2013 Client-Server Fast Upload And Download Feedback Optimizers.
U.S. Appl. No. 14/293,685, filed Jun. 2, 2014 Enhancement Of Upload And/Or Download Performance Based On Client And/Or Server Feedback Information.
U.S. Appl. No. 61/751,578, filed Jan. 11, 2013 Functionalities, Features, And User Interface Of A Synchronization Client To A Cloud-Based Environment.
U.S. Appl. No. 14/153,726, filed Jan. 13, 2014 Functionalities, Features, And User Interface Of A Synchronization Client To A Cloud-Based Environment.
U.S. Appl. No. 61/715,208, filed Oct. 17, 2012 Adaptive Architectures For Encryption Key Management In A Cloud-Based Environment.
U.S. Appl. No. 14/056,899, filed Oct. 17, 2013 Remote Key Management In A Cloud-Based Environment.
U.S. Appl. No. 61/709,086, filed Oct. 2, 2012 Visibility, Access Control, Advanced Reporting Api, And Enhanced Data Protection And Security Mechanisms For Administrators In An Enterprise.
U.S. Appl. No. 14/044,261, filed Oct. 2, 2013 System And Method For Enhanced Security And Management Mechanisms For Enterprise Administrators In A Cloud-Based Environment.
U.S. Appl. No. 61/709,653, filed Oct. 4, 2012 Corporate User Discovery And Identification Of Recommended Collaborators In A Cloud Platform.
U.S. Appl. No. 14/046,294, filed Oct. 4, 2013 Corporate User Discovery And Identification Of Recommended Collaborators In A Cloud Platform.
U.S. Appl. No. 61/709,866, filed Oct. 4, 2012 Enhanced Quick Search Features, Low-Barrier Commenting/Interactive Features In A Collaboration Platform.
U.S. Appl. No. 14/046,523, filed Oct. 4, 2013 Enhanced Quick Search Features, Low-Barrier Commenting/Interactive Features In A Collaboration Platform.
U.S. Appl. No. 61/709,407, filed Oct. 4, 2012 Seamless Access, Editing, And Creation Of Files In A Web Interface Or Mobile Interface To A Cloud Platform.
U.S. Appl. No. 14/046,726, filed Oct. 4, 2013 Seamless Access, Editing, And Creation Of Files In A Web Interface Or Mobile Interface To A Collaborative Cloud Platform.

(56) References Cited

OTHER PUBLICATIONS

U.S. Appl. No. 61/710,182, filed Oct. 5, 2012 Embedded Html Folder Widget For Accessing A Cloud Collaboration Platform And Content From Any Site.
U.S. Appl. No. 14/047,223, filed Oct. 7, 2013 System And Method For Generating Embeddable Widgets Which Enable Access To A Cloud-Based Collaboration Platform.
U.S. Appl. No. 61/750,474, filed Jan. 9, 2013 File System Event Monitor And Event Filter Pipeline For A Cloud-Based Platform.
U.S. Appl. No. 14/149,586, filed Jan. 7, 2014 File System Monitoring In A System Which Incrementally Updates Clients With Events That Occurred In A Cloud-Based Collaboration Platform.
U.S. Appl. No. 61/753,761 Conflict Resolution, Retry Condition Management, And Handling Of Problem Files For The Synchronization Client To A Cloud-Based Platform.
U.S. Appl. No. 14/158,626 Conflict Resolution, Retry Condition Management, And Handling Of Problem Files For The Synchronization Client To A Cloud-Based Platform.
U.S. Appl. No. 61/739,296, filed Dec. 19, 2012 Synchronization Of Read-Only Files/Folders By A Synchronization Client With A Cloud-Based Platform.
U.S. Appl. No. 14/135,311, filed Dec. 19, 2013 Method and Apparatus For Synchronization Of Items With Read-Only Permissions In A Cloud-Based Environment.
U.S. Appl. No. 61/748,399, filed Jan. 2, 2013 Handling Action Log Framework Race Conditions For A Synchronization Client To A Cloud-Based Environment.
U.S. Appl. No. 14/146,658, filed Jan. 2, 2014 Race Condition Handling In A System Which Incrementally Updates Clients With Events That Occurred In A Cloud-Based Collaboration Platform.
U.S. Appl. No. 61/822,170, filed May 10, 2013 Identification And Handling Of Items To Be Ignored For Synchronization With A Cloud-Based Platform By A Synchronization Client.
U.S. Appl. No. 14/275,890, filed May 13, 2014 Identification And Handling Of Items To Be Ignored For Synchronization With A Cloud-Based Platform By A Synchronization Client.
U.S. Appl. No. 61/822,191, filed May 10, 2013 Systems And Methods For Depicting Item Synchronization With A Cloud-Based Platform By A Synchronization Client.
U.S. Appl. No. 14/275,401, filed May 12, 2014 Top Down Delete Or Unsynchronization On Delete Of And Depiction Of Item Synchronization With A Synchronization Client To A Cloud-Based Platform.
U.S. Appl. No. 61/834,756, filed Jun. 13, 2013 Systems And Methods For Event Building, Collapsing, Or Monitoring By A Synchronization Client Of A Cloud-Based Platform.
U.S. Appl. No. 14/304,038, filed Jun. 13, 2014 Systems And Methods For Synchronization Event Building And/Or Collapsing By A Synchronization Component Of A Cloud-Based Platform.
U.S. Appl. No. 61/838,176, filed Jun. 21, 2013 Maintaining And Updating File System Shadows On A Local Device By A Synchronization Client Of A Cloud-Based Platform.
U.S. Appl. No. 14/312,482, filed Jun. 23, 2014 Maintaining And Updating File System Shadows On A Local Device By A Synchronization Client Of A Cloud-Based Platform.
U.S. Appl. No. 61/839,325, filed Jun. 23, 2013 Systems And Methods For Improving Performance Of A Cloud-Based Platform.
U.S. Appl. No. 14/314,887, filed Jun. 25, 2014 Systems And Methods For Managing Upgrades, Migration Of User Data And Improving Performance Of A Cloud-Based Platform.
U.S. Appl. No. 61/839,331, filed Jun. 25, 2013 Systems And Methods For Providing Shell Communication In A Cloud-Based Platform.
U.S. Appl. No. 14/314,677, filed Jun. 25, 2014 Systems And Methods For Providing Shell Communication In A Cloud-Based Platform.
U.S. Appl. No. 13/954,680, filed Jul. 30, 2013 System And Method For Advanced Control Tools For Administrators In A Cloud-Based Service.
U.S. Appl. No. 61/860,050, filed Jul. 30, 2013 Scalability Improvement In A System Which Incrementally Updates Clients With Events That Occurred In A Cloud-Based Collaboration Platform.
U.S. Appl. No. 14/194,091, filed Feb. 28, 2014 Scalability Improvement In A System Which Incrementally Updates Clients With Events That Occurred In A Cloud-Based Collaboration Platform.
U.S. Appl. No. 13/953,668, filed Jul. 29, 2013 System And Method For Advanced Search And Filtering Mechanisms For Enterprise Administrators In A Cloud-Based Environment.
U.S. Appl. No. 14/531,035, filed Jul. 3, 2014 System And Method For Advanced Search And Filtering Mechanisms For Enterprise Administrators In A Cloud-Based Environment.
U.S. Appl. No. 14/026,674, filed Sep. 13, 2013 Configurable Event-Based Automation Architecture For Cloud-Based Collaboration Platforms.
U.S. Appl. No. 61/877,917, filed Sep. 13, 2013 Systems and Method For Configuring Event-Based Automation In Cloud-Based Collaboration Platforms.
U.S. Appl. No. 14/075,849, filed Nov. 8, 2013 Systems And Methods For Configuring Event-Based Automation In Cloud-Based Collaboration Platforms.
U.S. Appl. No. 14/027,149, filed Sep. 13, 2013 Simultaneous Editing/Accessing Of Content By Collaborator Invitation Through A Web-Based Or Mobile Application To A Cloud-Based Collaboration Platform.
U.S. Appl. No. 14/042,473, filed Sep. 30, 2013 Simultaneous Editing/Accessing Of Content By Collaborator Invitation Through A Web-Based Or Mobile Application To A Cloud-Based Collaboration Platform.
U.S. Appl. No. 14/026,837, filed Sep. 13, 2013 Mobile Device, Methods And User Interfaces Thereof In A Mobile Device Platform Featuring Multifunctional Access and Engagement In A Collaborative Environment Provided By A Cloud-Based Platform.
U.S. Appl. No. 14/166,414, filed Jan. 28, 2014 System And Method Of A Multi-Functional Managing User Interface For Accessing A Cloud-Based Platform Via Mobile Devices.
U.S. Appl. No. 14/027,147, filed Sep. 13, 2013 System And Method For Rendering Document In Web Browser Or Mobile Device Regardless Of Third-Party Plug-In Software.
U.S. Appl. No. 61/877,938, filed Sep. 13, 2013 High Availability Architecture For A Cloud-Based Concurrent-Access Collaboration Platform.
U.S. Appl. No. 14/474,507 High Availability Architecture For A Cloud-Based Concurrent-Access Collaboration Platform.
U.S. Appl. No. 61/894,340, filed Oct. 22, 2013 Desktop Application For Accessing A Cloud Collaboration Platform.
U.S. Appl. No. 14/521,134, filed Oct. 22, 2014 Desktop Application For Accessing A Cloud Collaboration Platform.
U.S. Appl. No. 14/472,540, filed Aug. 29, 2014 Enhanced Remote Key Management For An Enterprise in a Cloud-Based Environment.
U.S. Appl. No. 14/474,008, filed Aug. 28, 2014 Configurable Metadata-Based Automation And Content Classification Architecture For Cloud-Based Collaboration Platforms.

\* cited by examiner determining the validity of the response

1100

| Header | Meaning |
|---|---|
| To: | E-mail address(es) of primary recipient(s) |
| Cc: | E-mail address(es) of secondary recipient(s) |
| Bcc: | E-mail address(es) for blind carbon copies |
| From: | Person or people who created the message |
| Sender: | E-mail address of the actual sender |
| Received: | Line added by each transfer agent along the route |
| Return-Path: | Can be used to identify a path back to the sender |

*FIG. 11*

SYSTEMS AND METHODS FOR SECURELY SUBMITTING COMMENTS AMONG USERS VIA EXTERNAL MESSAGING APPLICATIONS IN A CLOUD-BASED PLATFORM

CROSS-REFERENCE TO RELATED APPLICATION

The present application claims priority to and benefit from U.S. Provisional Patent Application Ser. No. 61/668,791 titled "SYSTEMS AND METHODS FOR SPECIFYING USER AND ITEM IDENTIFIERS WITHIN AN EMAIL ADDRESS FOR SECURELY SUBMITTING COMMENTS VIA EMAIL", filed on Jul. 6, 2012, the content of which is incorporated by reference herein.

BACKGROUND

As electronic and digital content use in enterprise settings and/or other organizational settings has become the preferred mechanism for project, task, and work flow management, so has the need for streamlined collaboration and sharing of digital content and documents. In such collaboration environments, multiple users share, access, and otherwise perform actions or tasks on content and files in shared workspaces. This shared access and collaboration requires high availability of the data (e.g., an unfettered ability to download and upload files) as any number of users may have access to a file at any given time.

Overall, the examples herein of some related systems and their associated limitations are intended to be illustrative and not exclusive. Other limitations of existing or prior systems will become apparent to those of skill in the art upon reading the following.

BRIEF DESCRIPTION OF THE DRAWINGS

FIG. 11 depicts an example electronic mail (email) header including various header fields that can be used to facilitate secure submission of comments via external messaging applications.

DETAILED DESCRIPTION

Figure 1:
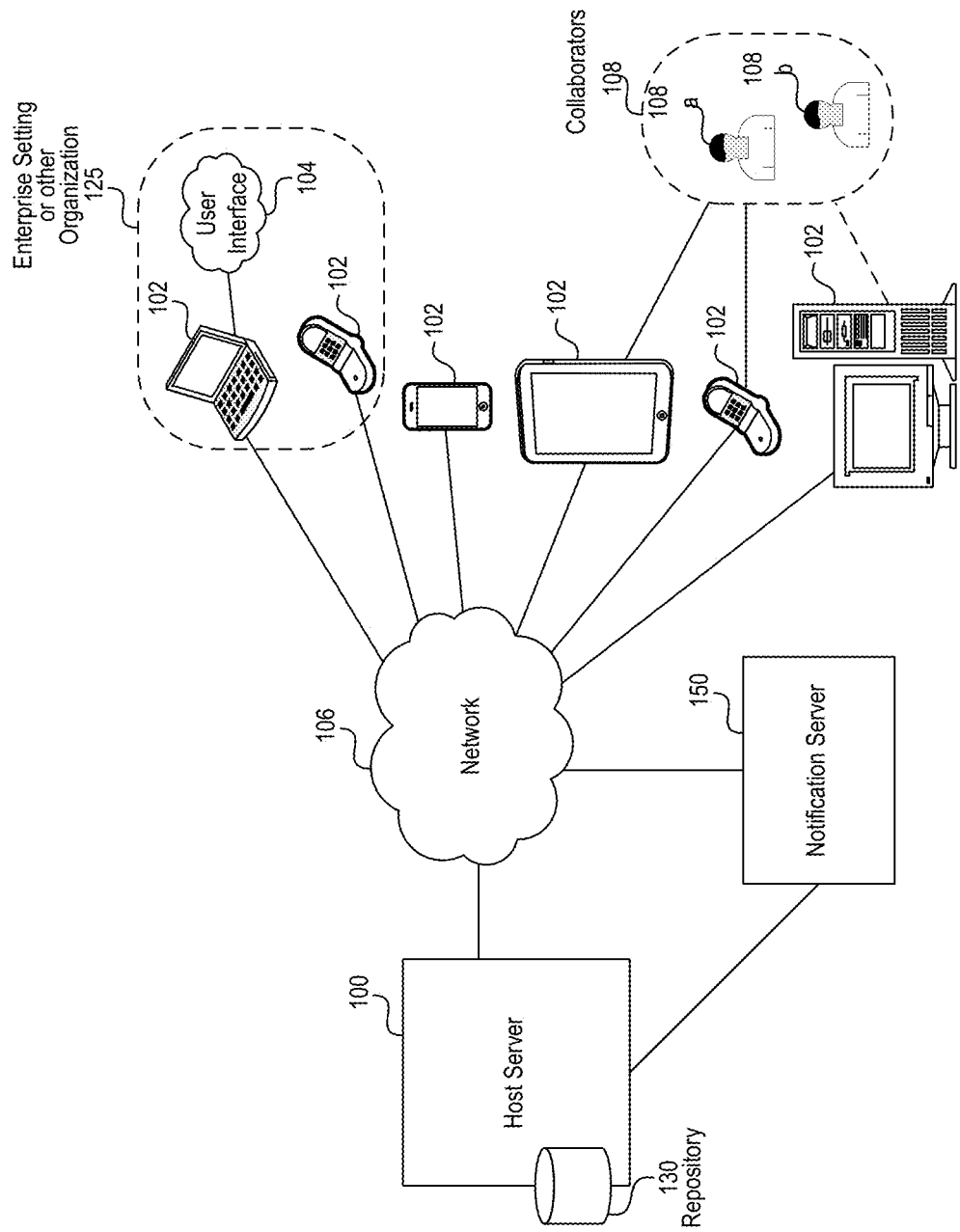
FIG. 1 illustrates an example diagram of a system having a host server of a cloud service and/or cloud storage accounts with capabilities that enable secure submission of comments via external messaging applications.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Collaboration environments can include features or mechanisms that allow users or collaborators to add or submit comments on files and folders (items), and to reply to comments, via email and/or other external messaging applications. For example, a user can receive an email notification associated with a particular content item and respond to the notification with a comment for that content item. Due to permission and privacy settings, however, users are typically only allowed to leave comments on items which they are authorized to view.

Unfortunately, as discussed above, the current mechanisms are not secure. For example, when a notification regarding a particular content item is sent by email, the email header can contain information indicating the particular content item (e.g., content identifier) and/or user (e.g., a user identifier). Therefore, another user that is not otherwise authorized to comment on a particular content item can comment on that content item if the user obtains the appropriate user identifier and/or content item identifier. This information is often contained in and obtainable from an email header.

Embodiments of the present disclosure include systems and methods for securely commenting on content items in a collaborative cloud-based environment via external messaging applications such as, for example, electronic mail (e.g., email or SMS).

FIG. 1 illustrates an example diagram of a system having a host server 100 of a cloud service and/or cloud storage accounts with capabilities that enable secure submission of comments via external messaging applications.

The client devices 102 can be any system and/or device, and/or any combination of devices/systems that is able to establish a connection, including wired, wireless, cellular connections with another device, a server and/or other systems such as host server 100 and/or notification server 150. Client devices 102 will typically include a display and/or other output functionalities to present information and data exchanged between among the devices 102 and/or the host server 100 and/or notification server 150.

For example, the client devices 102 can include mobile, hand held or portable devices or non-portable devices and can be any of, but not limited to, a server desktop, a desktop computer, a computer cluster, or portable devices including, a notebook, a laptop computer, a handheld computer, a palmtop computer, a mobile phone, a cell phone, a smart phone, a PDA, a Blackberry device, a Treo, a handheld tablet (e.g. an iPad, a Galaxy, Xoom Tablet, etc.), a tablet PC, a thin-client, a hand held console, a hand held gaming device or console, an iPhone, and/or any other portable, mobile, hand held devices, etc. running on any platform or any operating system (e.g., Mac-based OS (OS X, iOS, etc.), Windows-based OS (Windows Mobile, Windows 7, etc.), Android, Blackberry OS, Embedded Linux platforms, Palm OS, Symbian platform. In one embodiment, the client devices 102, host server 100, and app server 110 are coupled via a network 106. In some embodiments, the devices 102 and host server 100 may be directly connected to one another.

The input mechanism on client devices 102 can include touch screen keypad (including single touch, multi-touch, gesture sensing in 2D or 3D, etc.), a physical keypad, a mouse, a pointer, a track pad, motion detector (e.g., including 1-axis, 2-axis, 3-axis accelerometer, etc.), a light sensor, capacitance sensor, resistance sensor, temperature sensor, proximity sensor, a piezoelectric device, device orientation detector (e.g., electronic compass, tilt sensor, rotation sensor, gyroscope, accelerometer), or a combination or variation of the above.

Signals received or detected indicating user activity at client devices 102 through one or more of the above input mechanism, or others, can be used in the disclosed technology by various users or collaborators (e.g., collaborators 108) for accessing, through network 106, a web-based collaboration environment or online collaboration platform (e.g., hosted by the host server 100).

The collaboration platform or environment hosts workspaces with work items that one or more users can access (e.g., view, edit, update, revise, comment, download, preview, tag, or otherwise manipulate, etc.). A work item can generally include any type of digital or electronic content that can be viewed or accessed via an electronic device (e.g., device 102). The digital content can include .pdf files, .doc, slides (e.g., Powerpoint slides), images, audio files, multimedia content, web pages, blogs, etc. A workspace can generally refer to any grouping of a set of digital content in the collaboration platform. The grouping can be created, identified, or specified by a user or through other means. This user may be a creator user or administrative user, for example.

In general, a workspace can be associated with a set of users or collaborators (e.g., collaborators 108) which have access to the content included therein. The levels of access (e.g., based on permissions or rules) of each user or collaborator to access the content in a given workspace may be the same or may vary among the users. Each user may have their own set of access rights to every piece of content in the workspace, or each user may be different access rights to different pieces of content. Access rights may be specified by a user associated with a work space and/or a user who created/uploaded a particular piece of content to the workspace, or any other designated user or collaborator.

In general, the collaboration platform allows multiple users or collaborators to access or collaborate efforts on work items such each user can see, remotely, edits, revisions, comments, or annotations being made to specific work items through their own user devices. For example, a user can upload a document to a work space for other users to access (e.g., for viewing, editing, commenting, signing-off, or otherwise manipulating). The user can login to the online platform and upload the document (or any other type of work item) to an existing work space or to a new work space. The document can be shared with existing users or collaborators in a work space.

Figure 2:
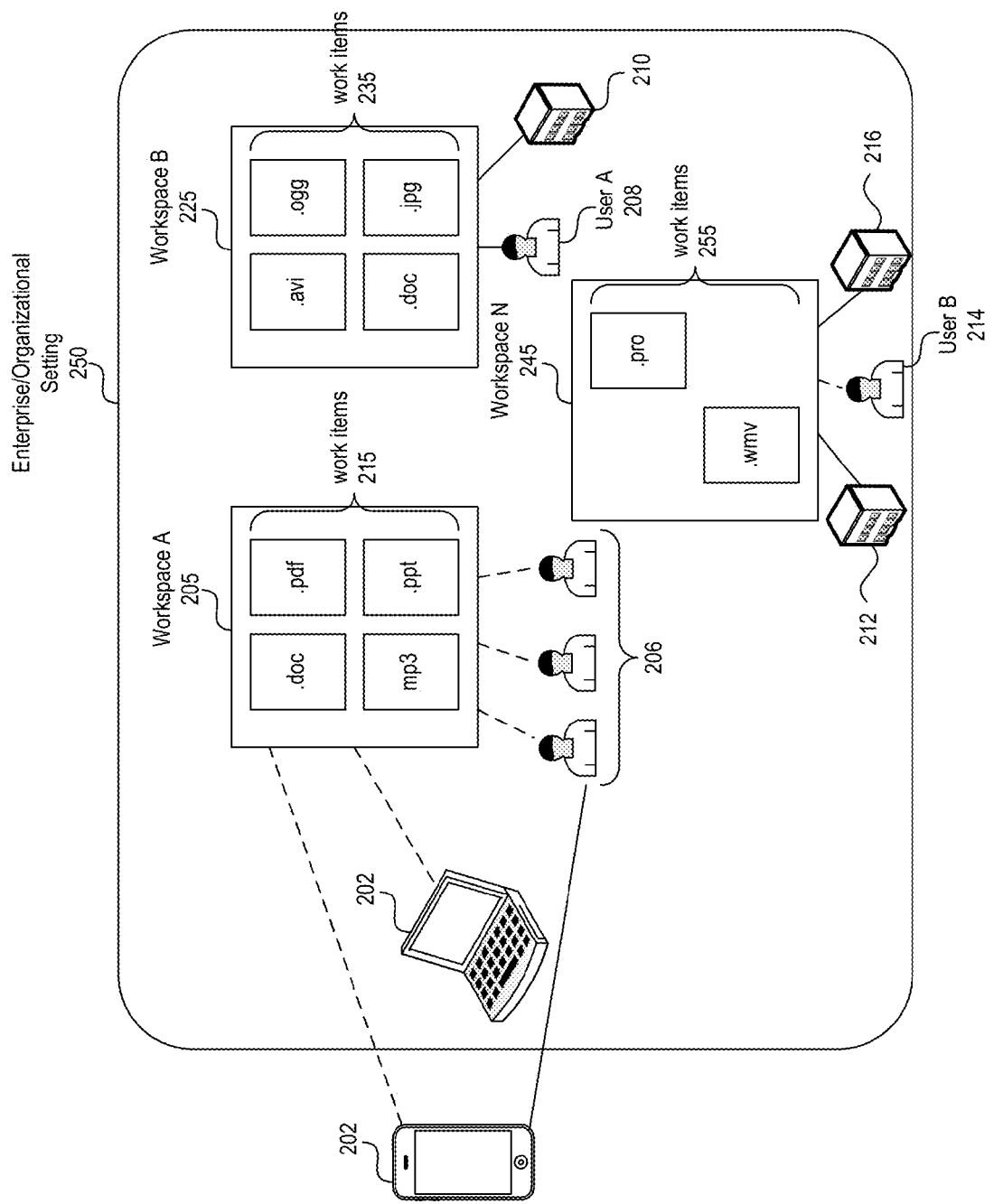
FIG. 2 depicts a diagram of a web-based or online collaboration platform deployed in an enterprise or other organizational setting for organizing work items and workspaces, as one example of a hosted cloud service and/or cloud storage accounts with capabilities that enable secure submission of comments via external messaging applications.

A diagrammatic illustration of the online collaboration environment and the relationships between workspaces and users/collaborators are illustrated with further reference to the example of FIG. 2. A diagrammatic illustration of a workspace having multiple work items with which collaborators can access through multiple devices is illustrated with further reference to the example of FIG. 3.

In one embodiment, client devices 102 communicate with the host server 100 and/or people search engine 150 over network 106. In general, network 106, over which the client devices 102, the host server 100, and/or people search engine 150 communicate, may be a cellular network, a telephonic network, an open network, such as the Internet, or a private network, such as an intranet and/or the extranet, or any combination thereof. For example, the Internet can provide file transfer, remote log in, email, news, RSS, cloud-based services, instant messaging, visual voicemail, push mail, VoIP, and other services through any known or convenient protocol, such as, but is not limited to the TCP/IP protocol, Open System Interconnections (OSI), FTP, UPnP, iSCSI, NSF, ISDN, PDH, RS-232, SDH, SONET, etc.

The network 106 can be any collection of distinct networks operating wholly or partially in conjunction to provide connectivity to the client devices 102 and the host server 100 and may appear as one or more networks to the serviced systems and devices. In one embodiment, communications to and from the client devices 102 can be achieved by, an open network, such as the Internet, or a private network, such as an intranet and/or the extranet. In one embodiment, communications can be achieved by a secure communications protocol, such as secure sockets layer (SSL), or transport layer security (TLS).

In addition, communications can be achieved via one or more networks, such as, but are not limited to, one or more of WiMax, a Local Area Network (LAN), Wireless Local Area Network (WLAN), a Personal area network (PAN), a Campus area network (CAN), a Metropolitan area network (MAN), a Wide area network (WAN), a Wireless wide area network (WWAN), enabled with technologies such as, by way of example, Global System for Mobile Communications (GSM), Personal Communications Service (PCS), Digital Advanced Mobile Phone Service (D-Amps), Bluetooth, Wi-Fi, Fixed Wireless Data, 2G, 2.5G, 3G, 4G, IMT-Advanced, pre-4G, 3G LTE, 3GPP LTE, LTE Advanced, mobile WiMax, WiMax 2, WirelessMAN-Advanced networks, enhanced data rates for GSM evolution (EDGE), General packet radio service (GPRS), enhanced GPRS, iBurst, UMTS, HSPDA, HSUPA, HSPA, UMTS-TDD, 1xRTT, EV-DO, messaging protocols such as, TCP/IP, SMS, MMS, extensible messaging and presence protocol (XMPP), real time messaging protocol (RTMP), instant messaging and presence protocol (IMPP), instant messaging, USSD, IRC, or any other wireless data networks or messaging protocols.

In one embodiment, actions performed on work items or other activities that occur in a workspace can be detected in real time or in near real time. The host server can generate notifications or notification events for one or more of the plurality of activities and select one or more recipients for each notification. Various mechanisms or external messaging applications can then be used to notify users or collaborators, including through the web interface to access the collaboration platform, via email, and/or SMS, for example.

FIG. 2 depicts a diagram of a web-based or online collaboration platform deployed in an enterprise or other organizational setting 250 for organizing work items 215, 235, 255 and workspaces 205, 225, 245, as one example of a hosted cloud file sharing, collaboration service and/or cloud storage service with capabilities that enable secure submission of comments via external messaging applications.

The web-based platform for collaborating on projects or jointly working on documents can be used by individual users and shared among collaborators. In addition, the collaboration platform can be deployed in an organized setting including but not limited to, a company (e.g., an enterprise setting), a department in a company, an academic institution, a department in an academic institution, a class or course setting, or any other types of organizations or organized setting.

When deployed in an organizational setting, multiple workspaces (e.g., workspace A-N) may be created to support different projects or a variety of work flows. Each workspace may have its own associate work items. For example, work space A 205 may be associated with work items 215, work space B 225 may be associated with work items 235, and work space N may be associated with work items 255. The work items 215, 235, and 255 may be unique to each work space but need not be. For example, a particular word document may be associated with only one work space (e.g., work space A 205) or it may be associated with multiple work spaces (e.g., Work space A 205 and work space B 225, etc.).

In general, each work space has a set of users or collaborators associated with it. For example, work space A 205 is associated with multiple users or collaborators 206. In some instances, work spaces deployed in an enterprise may be department specific. For example, work space B may be associated with department 210 and some users shown as example user A 208 and workspace N 245 may be associated with departments 212 and 216 and users shown as example user B 214.

Each user associated with a work space may generally access the work items associated with the work space. The level of access may depend on permissions associated with the specific work space, and/or with a specific work item. Permissions may be set for the work space or set individually on a per work item basis. For example, the creator of a work space (e.g., one of user A 208 who creates work space B) may set one permission setting applicable to all work items 235 for other associated users and/or users associated with the affiliate department 210, for example. Creator user A 208 may also set different permission settings for each work item, which may be the same for different users, or varying for different users.

In each work space A, B, . . . , N, when an action is performed on a work item by a given user or any other activity is detected in the work space, other users in the same work space may be notified (e.g., in real time or in near real time, or not in real time). Activities which trigger real time notifications can include, by way of example but not limitation, adding, deleting, or modifying collaborators in the work space, uploading, downloading, adding, deleting a work item in the work space, creating a discussion topic in the work space.

Specifically, items or content (content items) downloaded or edited in accordance with the techniques described in the present disclosure can cause notifications to be generated. Such notifications can be sent to relevant users to notify them of actions surrounding a download, an edit, a change, a modification, a new file, a conflicting version, an upload of an edited or modified file.

In one embodiment, in a user interface of the web-based collaboration platform where notifications are presented, users can, via the user interface, create action items (e.g., tasks) and delegate the action items to other users including collaborators pertaining to a work item 215, for example. The collaborators 206 may be in the same workspace A 205 or the user may include a newly invited collaborator. Similarly, in the same user interface where discussion topics can be created in a work space (e.g., work space A, B or N, etc.), actionable events on work items can be created and/or delegated/assigned to other users such as collaborators of a given work space 206 or other users. Through the same user interface, task status and updates from multiple users or collaborators can be indicated and reflected. In some instances, the users can perform the tasks (e.g., review or approve or reject, etc.) via the same user interface.

Figure 3:
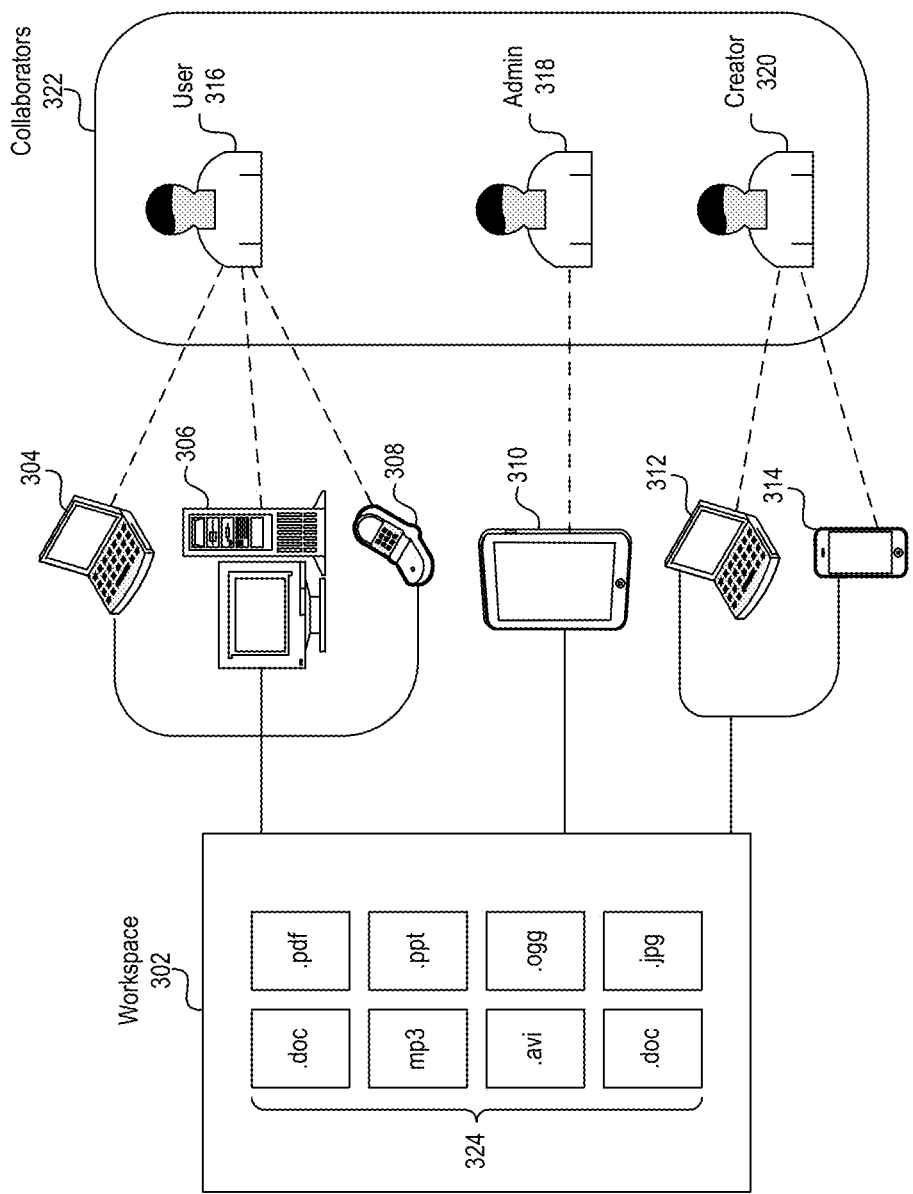
FIG. 3 depicts an example diagram of a workspace in a cloud-based, online or web-based collaboration environment accessible by multiple collaborators through various devices authorized to access the work space.

FIG. 3 depicts an example diagram of a workspace 302 in an online or web-based collaboration environment accessible by multiple collaborators 322 through various devices authorized to access the work space.

Each of users 316, 318, and 320 may individually use multiple different devices to access and/or manipulate work items 324 (e.g., content items) in the work space 302 with which they are associated with. For example users 316, 318, 320 may be collaborators on a project to which work items 324 are relevant. Since the work items 324 are hosted by the collaboration environment (e.g., a cloud-based environment), each user may access the work items 324 anytime, and from any physical location using any device (e.g., including devices they own or any shared/public/loaner device).

Work items to be edited or viewed may be accessed from the workspace 302 in accordance with the platform and/or application independent mechanisms. Users may also be notified of access, edit, modification, and/or upload related-actions performed on work items 324 by other users or any other types of activities detected in the work space 302. For example, if user 316 modifies a document, one or both of the other collaborators 318 and 320 can be notified of the modification in real time, or near real-time, or not in real time. The notifications can be sent through any of all of the devices associated with a given user, in various formats including, one or more of, email, SMS, or via a pop-up window in a user interface in which the user uses to access the collaboration platform. In the event of multiple notifications, each notification may be depicted preferentially (e.g., ordering in the user interface) based on user preferences and/or relevance to the user (e.g., implicit or explicit).

For example, a notification of a download, access, read, write, edit, or upload related activities may be presented in a feed stream among other notifications through a user interface on the user device according to relevancy to the user determined based on current or recent activity of the user in the web-based collaboration environment.

In one embodiment, a notification feed stream includes updates when an invited user accepts an invitation and/or successfully creates a new account through receipt of an invitation from an existing user. The invited user, upon creation of the new account, receives the account having enhanced features. The new user can automatically be connected to the existing user who sent the invitation. The system can also automatically prompt both users to query they wish to be collaborators in a common work space.

Work items hosted by a collaboration environment (e.g., a cloud-based collaboration environment) can be accessed by users (e.g., users 316, 318, and 320) via multiple different devices (e.g., devices 304-314) for viewing, editing, processing or performing other manipulations on work items. The devices can include applications for accessing a server hosting a cloud-based platform or service or other backend web services (hereinafter "cloud-based collaboration platform application") and applications for viewing, editing, processing, or performing other manipulations on work items. The communication between such applications are generally facilitated by a communication mechanism of the OS. For example, in Android OS, the communication mechanism is based on "Intents". As previously described, the underlying communication mechanism are generally insecure, and any data passed between applications are visible to all other application on a device.

Figure 4:
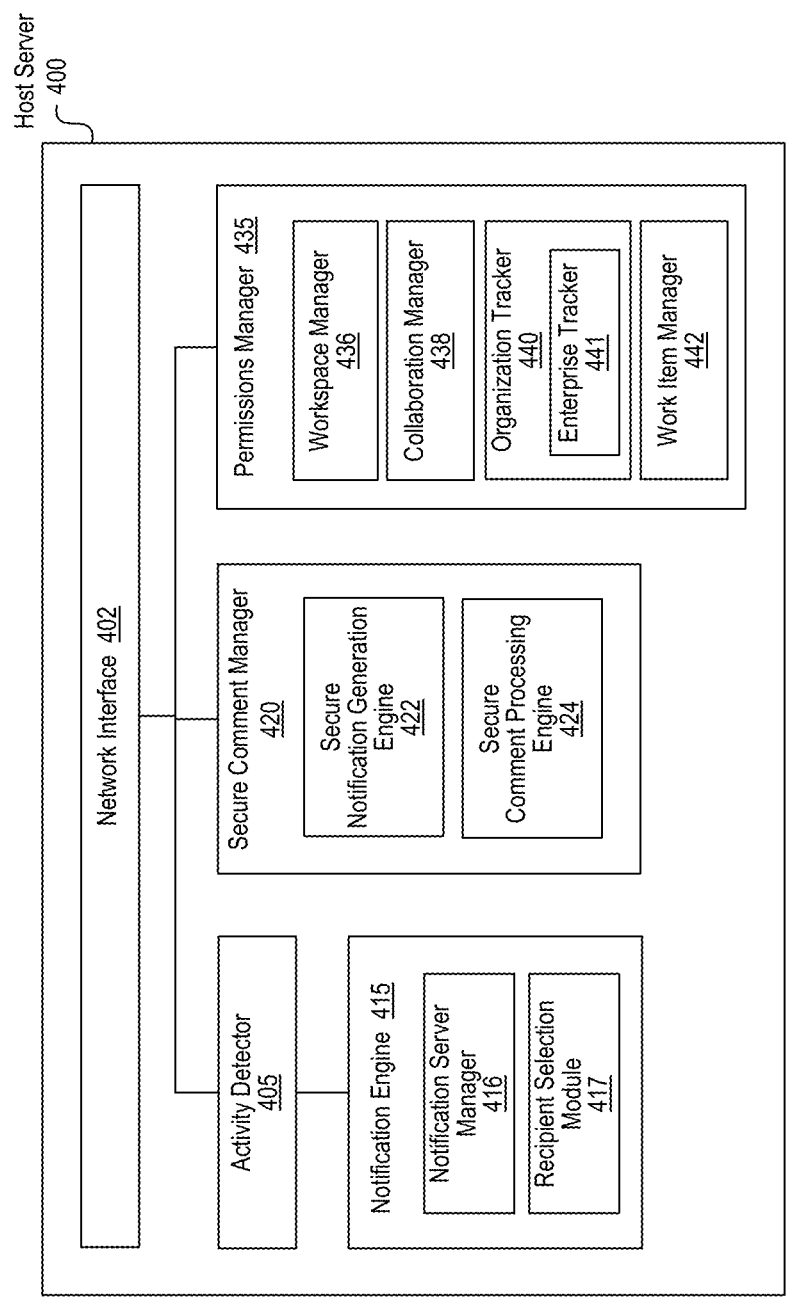
FIG. 4 depicts a block diagram illustrating an example of components in a host server for cloud-based services and storage accounts with capabilities that enable secure submission of comments via external messaging applications.

FIG. 4 depicts a block diagram illustrating an example of components in a host server 400 for cloud-based services and storage accounts with capabilities that enable secure submission of comments via external messaging applications. The host server 400 can be host server 100 of FIG. 1 although alternative configurations are possible.

The host server 400 of the web-based or online collaboration environment can generally be a cloud-based service. The host server 400 can include, for example, a network interface 402, an activity detector 405, a secure comment manager 420, a notification engine 415, and a permissions manager 435. The notification engine 415 can include a notification server manager 416 and a recipient selection module 417. The permission manager 435 can include a workspace manager 436, a collaboration manager 438, an organization tracker 440 having an enterprise tracker 441, and a work item manager 442. Additional or fewer components/modules/engines can be included in the host server 400 and each illustrated component. Further, although illustrated as included as part of the host server 400, the components/modules/engines can be physically and/or functionally distributed.

The network interface 402 can be a networking module that enables the host server 400 to mediate data in a network with an entity that is external to the host server 100, through any known and/or convenient communications protocol supported by the host and the external entity. The network interface 402 can include one or more of a network adaptor card, a wireless network interface card (e.g., SMS interface, WiFi interface, interfaces for various generations of mobile communication standards including but not limited to 1G, 2G, 3G, 3.5G, 4G, LTE, etc.), Bluetooth, a router, an access point, a wireless router, a switch, a multilayer switch, a protocol converter, a gateway, a bridge, bridge router, a hub, a digital media receiver, and/or a repeater.

As used herein, a "module," "a manager," a "handler," a "detector," an "interface," or an "engine" includes a general purpose, dedicated or shared processor and, typically, firmware or software modules that are executed by the processor. Depending upon implementation-specific or other considerations, the module, manager, hander, or engine can be centralized or its functionality distributed. The module, manager, hander, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

One embodiment of the host server 400 includes the activity detector 405 which can detect an activity in the web-based collaboration environment. The activity can be a triggering activity which causes a notification to be generated and/or added to one or more queues associated with selected or relevant users so that those selected or relevant users are notified of the occurrence of the activity in real-time or near real time and/or in a batched notification at a later time.

The detected activity can be performed by a user or collaborator in a workspace and can be performed on a work item or relating to a work item, for example, download or upload of the work item, previewing, commenting of a work item, deletion or editing of the work item, commenting on a work item, identifying, selecting, adding, deleting, saving, editing, and modifying a tag in the work item, setting or changing permissions of the work item, sharing the work item including, for example, emailing a link to the work item, embedding a link to the work item on another website. The types of activities that can be detected can also relate to changes to a workspace, such as adding, deleting, or modifying collaborators in the workspace; changes to work items such as adding, deleting a work item in the workspace; creating a discussion topic in the workspace, adding a response to a discussion topic, deleting a response, or editing a response in the workspace.

Detected activity in a workspace that is performed by a user or otherwise occurring can trigger notifications to be generated and sent out in real-time or near real-time and/or subsequently sent out via a batched notifications at later times via, for example, the notification engine 415. The notification engine 415 can notify users, which can be collaborators with the user who performed the activity in the workspace, via one or more of many mechanisms, including but not limited to, email, SMS, voice-message, text-based message, RSS, feed, etc. The mechanisms can be configurable by each user or collaborator based on the type of activity that occurred and/or where the activity occurred in the workspace (e.g., which storage container or folder in the workspace).

In one embodiment, the notification is depicted through a web-browser to another user in the web-based collaboration environment. In some embodiments, the notification can be depicted in real-time or near real-time to the time in which the activity was performed by the user and/or at some later time in a batched notification with other notifications that are to be depicted to the user. When notifying a user in real-time or through the use of a batched notification using a web-browser, the notification engine 415 can utilize a push-enabled service. In one embodiment, the real-time or batched notifications are sent by a component or another server which implements push technology (e.g., the notification server 500 shown in the example of FIG. 5). The push-enabled service can be implemented via long poll or HTTP streaming, for example, by the notification server 500 or another component, device which may be internal to or external to the host server 400. In addition, the host server 400 could utilize other push servers including third party push servers to implement push technology including but not limited to mobile platform push systems and services (e.g., via smart phones or tablets or other portable devices such as iPhone, Android phones, Blackberry, iPad, Galaxy or other tablets, etc.).

The host server 400 can send a notification server an identification of the recipient to be notified and an indicator of the one or more activities to notify the recipient of (e.g., via a batched notification). The indicator of the one or more activities to notify the recipient of can be in the form of a batched notification which comprises one or more notifications that are stored in a queue associated with the recipient. Alternatively or additionally, the host server 400 can send the notification server the address or location or multiple locations of the queue(s) from which to read and send the notifications as a batched notification to the user. Use of an external push server, such as the notification server 550 is described with further reference to the example of FIG. 5.

The notification server 550 can be managed by the notification server manager 416 in the notification engine 415 which can communicate events to notify users in real-time via their browser interfaces or queue up notifications to send users batched notifications. In one embodiment, the host server sends a notification server an identification of the recipient to be notified and/or an indicator of the one or more activities to notify the recipient of (e.g., via a real-time and/or batched notification).

The recipient selection module 417 can select one or more users for each notification event. For example, the selection module 417 can select one or more recipients for each notification or notification event that is generated by the notification generation module 418. The recipients can be selected, for example, according to criteria determined based on a workspace in which the associated activity was performed in the online collaboration environment. The criteria may be determined in a variety of ways. For example, the criteria can be determined based on an affiliation with a workspace or storage container in which the activity was performed in the online collaboration platform, based on an affiliation with the work item on which the activity was performed, based on permissions configured for the workspace, storage container, or work item, and/or based on predetermined settings configured for the workspace, storage container or folder, and/or individual work items. Combinations and/or variations of the criteria are also possible.

One embodiment of the host server 400 includes the secure comment manager 420 which can generate notifications with secure information and process received responses to notifications including comments to determine whether or not to submit the comments. The secure comment manager 420 facilitates submission of secure comments on content items (e.g., files and/or folders).

In one embodiment, the secure comment manager 420 includes the secure notification generation engine 422. The secure notification generation engine 422 is configured to generate a notification including secure information responsive to a trigger (e.g., action requiring notification of one or more users).

In one embodiment, the notification comprises an email including one or more email headers. As shown and discussed in greater detail with reference to FIG. 11, an email can include a Reply-to email header. The secure notifications can be accomplished using the Reply-to email header. The From header is a generic header for the application, but when a user replies within a mail client to an email notification the response can be sent to the address specified in the Reply-to header. For example, a Reply-to header may include an email address "userid.contentid@reply.company.com." In this example, the prefix is "userid.contentid," and the domain for that address is "@reply.company.com." The domain can direct the email to a particular mail server. In one embodiment, reply emails from an "@reply . . . " domain can be filtered from other domain messages (e.g., "@company.com").

The Reply-to header is typically not shown (visible to users) by email applications but it can be accessed by users and thus a malicious user could ascertain a user ID and a content ID from an email address prefix and responsively send an email that appears to be a response to the email notification. That is, a malicious user can email a comment on a content item that the malicious user does not have permission to access.

Accordingly, as described herein, a prefix can be modified such that the user ID and the content ID can be extracted by the system but not modified by malicious users. The secure notification generation engine 422 performs this modification process by generating a unique message authentication code (MAC) based on a message (MSG) that can include, for example, the user ID and the content ID. In some embodiments, the MSG can also include a time stamp. The MAC can be generated based on the MSG using, for example, an integrity key (or code) that is kept secret. A deterministic hashing algorithm can be utilized with the integrity key to generate the MAC (i.e., a unique code). Example operation (data flow) of the secure notification generation engine 422 is shown an discussed in greater detail with reference to FIG. 6.

In one embodiment, the secure comment manager 420 includes the secure comment processing engine 424. The secure comment processing engine 424 is configured to process a response including a comment and submit the comment if the response is verified. For example, the secure comment processing engine 424 can parse and/or otherwise extract the MSG from a response and generate.

For example, the secure comment manager 420 can parse a response email into, for example, three parts: the comment, the prefix, and the domain. The prefix is then parsed into the MAC and the MSG. A new MAC can be generated based on the MSG using, for example, the integrity key (or code) that is kept secret. A deterministic hashing algorithm can be utilized with the integrity key to generate the new MAC. Once generated, the new MAC is compared to the received MAC. Consequently, if a malicious user attempts to change the MSG by modifying the user ID and/or the content ID, then the received MAC will not match the new MAC. Example operation (data flow) of the secure comment processing engine 424 is shown an discussed in greater detail with reference to FIG. 7.

In one embodiment, the secure comment manager 420 includes the permissions manager 435. The permissions manager 435 can manage the various user permissions in the in the cloud-based collaboration environment.

In one embodiment, the permissions manager 435 can include the workspace manager 436 which can manage user permissions based on a user's affiliation with a workspace, including, one or more of, member, invited collaborator and collaborator in the workspace. Such user affiliation can be tracked and managed by, for example, the collaboration manger 438.

In one embodiment, the permissions manager 435 can include the organization tracker 440 which tracks and/or manages enterprise associations and affiliations. For example; in some embodiments, enterprises and/or enterprise accounts can specifically be managed, tracked, monitored by the enterprise tracker 441. Permissions for the workspace can be configured by a creator or administrative user of the workspace. The collaboration manager 438 can determine, track, and implement relationships, roles, and/or access levels of multiple users/collaborators. For example, users may be a general user, a creator of the workspace, a creator of a work item, or an administrative user. The permissions for a workspace can be configured by a user, creator, or the administrative user and is generally managed by the collaborations manager 438.

In one embodiment, the permissions manager 435 can include the work item manager 442. Permissions associated with work items can be managed, tracked, updated, revised, or implemented, in one embodiment, by the work item manager 442. For example, the permissions associated with the work item can be set by, a creator of the work item or an administrative user of the workspace. Each workspace can include multiple work items where each of multiple work items has individually configurable permissions. The individually configured permissions can be determined by user roles and rights (e.g., as managed by the collaborations manager 438). The work item manager 442 can communicate with the collaboration manager 438 in setting, configuring, or re-configuring permissions associated with work items.

Figure 5:
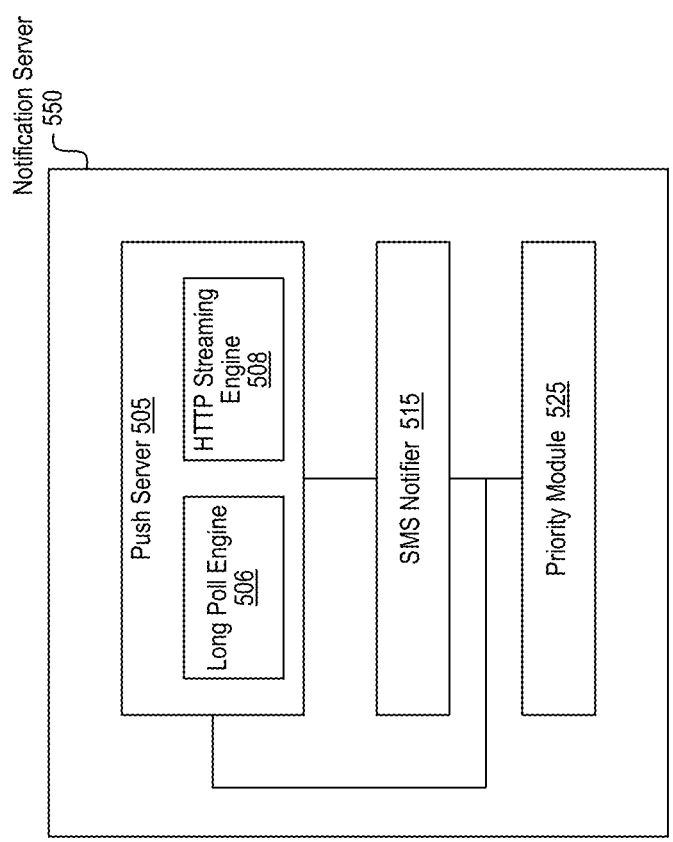
FIG. 5 depicts a block diagram illustrating an example of components in a notification server for providing real time or near real time notifications of activities that occur in a web-based or online collaboration environment.

FIG. 5 depicts a block diagram illustrating an example of components in a notification server 550 for providing real time or near real time notifications of activities that occur in a web-based or online collaboration environment. The notification server 550 generally includes, for example, a push server 505, an SMS notifier 515, and/or a priority module 525. In one embodiment, the push server 505 includes a long poll engine 506 and/or an HTTP streaming engine 508. Additional or less components/modules/engines can be included in the notification server 550 and each illustrated component.

As used herein, a "module," "a manager," a "handler," a "detector," an "interface," a "controller," or an "engine" includes a general purpose, dedicated or shared processor and, typically, firmware or software modules that are executed by the processor. Depending upon implementation-specific or other considerations, the module, manager, handler, or engine can be centralized or its functionality distributed. The module, manager, handler, or engine can include general or special purpose hardware, firmware, or software embodied in a computer-readable (storage) medium for execution by the processor. As used herein, a computer-readable medium or computer-readable storage medium is intended to include all mediums that are statutory (e.g., in the United States, under 35 U.S.C. 101), and to specifically exclude all mediums that are non-statutory in nature to the extent that the exclusion is necessary for a claim that includes the computer-readable (storage) medium to be valid. Known statutory computer-readable mediums include hardware (e.g., registers, random access memory (RAM), non-volatile (NV) storage, to name a few), but may or may not be limited to hardware.

The notification server 550 can support the services of a collaboration platform or environment to provide real time (or near real time) and/or batched notifications of activities. In one embodiment, the notification server 550 is integrated within a host server of a collaboration platform (e.g., the host server 100 shown in the example of FIG. 1 or the host server 400 shown in the example of FIG. 4, for example). The notification server 550 may also be externally coupled to the host server (e.g., the host server 100 or 400. In some instances, a portion of the functions implemented and performed by the notification server 550 can be implemented in part or in whole in the host server 100 or 400. For example, some of the components shown to be in the notification server 500 and associated functionalities can in part or in whole reside in the host server 100 or 400.

In one embodiment, the notification server 550 sends a notification of one or more activities that occur within a collaboration platform to a recipient. In some embodiments, the notification is sent by the server 550 such that the recipient is notified in real time (or near real time) to when the activity occurred or when the activity was performed. Alternatively or additionally, the notification can be sent as a batched notification upon expiry of a timer or upon another triggering event. Notification, including real-time notification, can be performed via push technology, for example by the push server 505 through long polls (e.g., via the long poll engine 506) and/or through the HTTP streaming (e.g., via the HTTP streaming engine 508). The notification server 550 can communicate with the host server to determine a recipient or recipients with whom to notify. The notification server 550 can also determine the activity or activities to notify the recipient of, for example through communication with the host server.

In one embodiment, the notification is presented in a feed stream among other notifications through a user interface on the user device according to relevancy to the user determined based on current or recent activity of the user in the web-based collaboration environment.

In one embodiment, the notification server 550 can send notifications to users via SMS (e.g., through the SMS notifier 515). In this instance, the notification server 500 can be coupled to an SMS center which forwards the SMS text message to a mobile device over a cellular network. The notification can be sent via SMS in real time or near real time, or with a delay.

Figure 6:
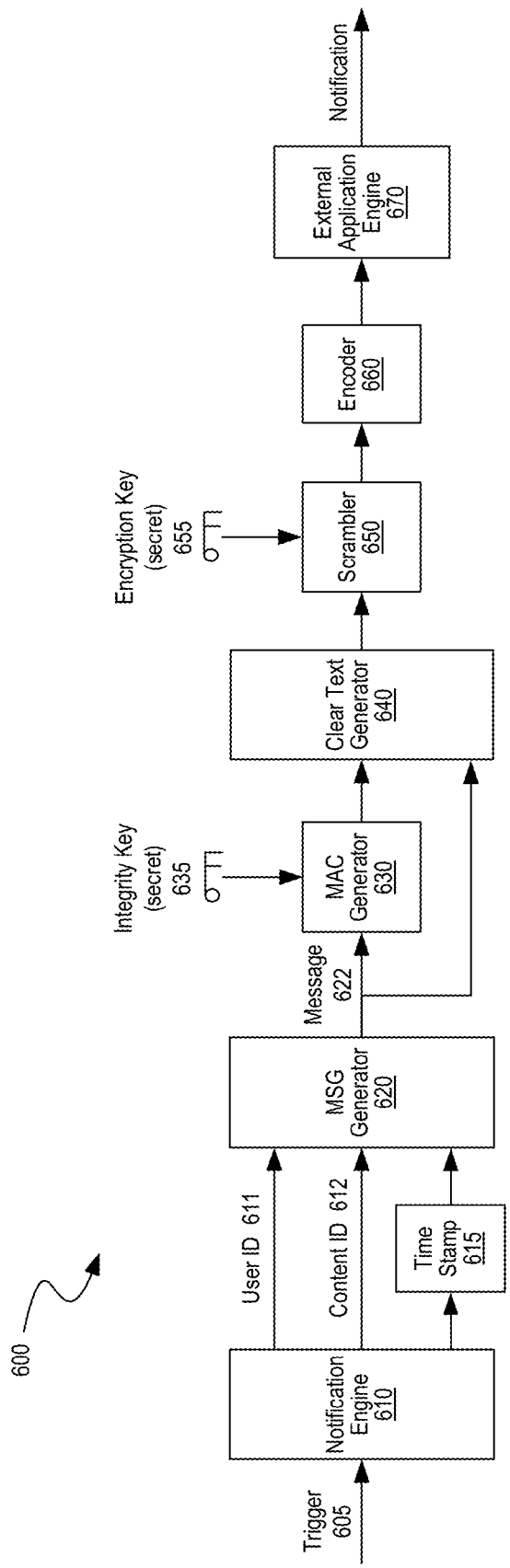
FIG. 6 depicts a data flow diagram illustrating an example of secure notification generation by a host server for cloud-based services and storage accounts with capabilities that enable secure submission of comments via external messaging applications.

FIG. 6 depicts a data flow diagram 600 illustrating an example of secure notification generation by a host server for cloud-based services and storage accounts with capabilities that enable secure submission of comments via external messaging applications.

To begin, a notification engine 610 receives a notification trigger associated with a particular content item and identifies an appropriate user (or collaborator) to which to send a notification. In the example of FIG. 6, the user is identifiable using user ID 611 and the particular content item is identifiable using a content ID 612. The notification engine 610 sends the user ID 611 and the content ID 612 to a MSG generator 620. Additionally, a timestamp 615 can also be generated to indicate the current time (or the time that the message (MSG) is generated. The timestamp may for example, indicate a date. Alternatively or additionally, the timestamp 615 can be more granular indicating a time of day.

The MSG generator 620 concatenates the user ID 611, the content ID 612, and/or the timestamp 615 into a message 622 which is sent to a MAC generator 630. The MAC generator 630 generates a message authentication code based on the message 622 using a secret integrity key 635. In one embodiment, the MAC generator 630 can generate the message authentication code by applying a deterministic hashing algorithm to the message using the secret integrity key. The deterministic hashing algorithm can be, for example, a keyed-hash message authentication code (HMAC).

The clear text generator 640 receives the message and the message authentication code generated by the MAC generator 630 and combines into a clear text. In one embodiment, the message comprises an email address prefix which is limited to 256 bits of data. In this case, the user ID 611, the content ID 612 and the timestamp 615 can each be represented by 64 bits and the message authentication code also can be represented by 64 bits for a total of 256 bits of data. As described herein, the message refers to the user ID 611, the content ID 612 and the timestamp 615. The clear text generator 640 then provides the message and the message authentication code to the scrambler 650 (or cipher).

The scrambler 650 scrambles the message and message authentication code using a secret encryption key 655. The scrambled data remains the same number of bits as the input (e.g., 256 bits). In one embodiment, the scrambler 650 uses the Advanced Encryption Standard (AES) to encrypt the message. The encrypted message is then provided to the encoder 660 that encodes the data. In one embodiment, the encoder 660 turns the bits into computer-readable text (or characters) that can be used in, for example, emails. Lastly, an external application engine 670 determines the appropriate form (e.g., email) and formats the notification. Although not shown, in some embodiments, the external application engine 670 can also provide various constraints based on the type of notification (e.g., email, SMS, etc.). The notification is then sent to the user (collaborator) identified by the user ID.

Figure 7:
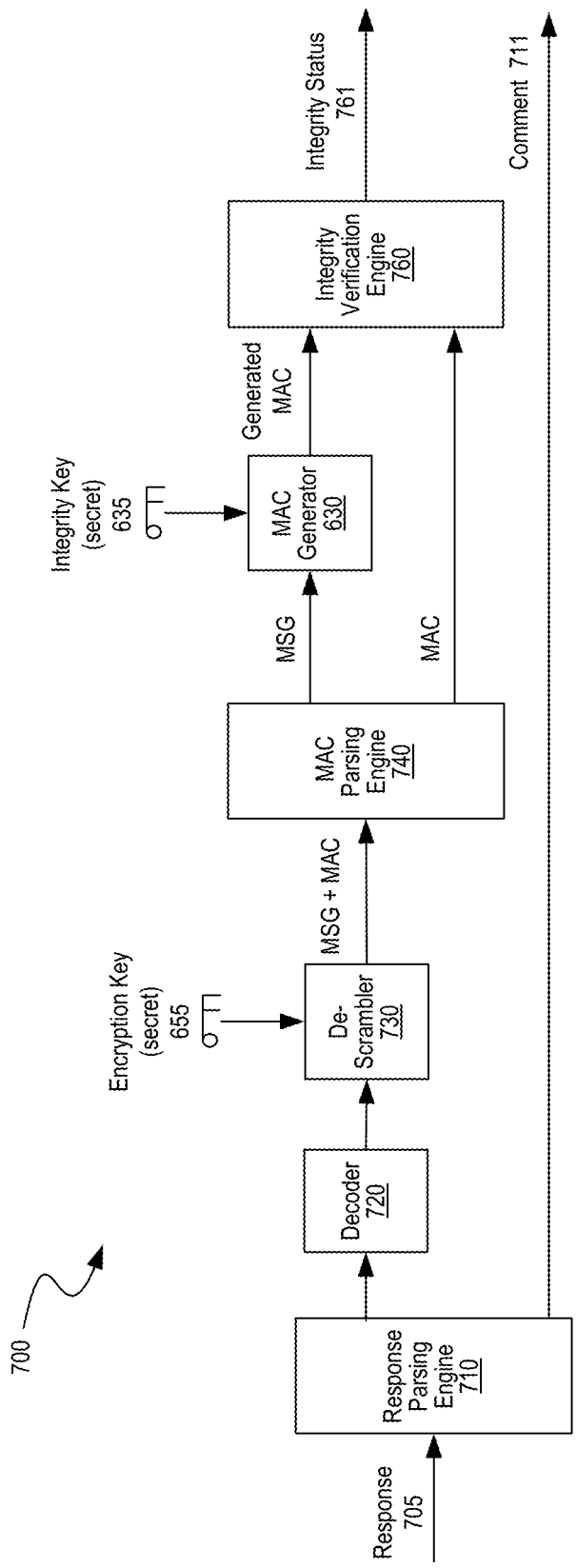
FIG. 7 depicts a data flow diagram illustrating an example of secure comment processing by a host server for cloud-based services and storage accounts with capabilities that enable secure submission of comments via external messaging applications.

FIG. 7 depicts a data flow diagram 700 illustrating an example of secure comment processing by a host server for cloud-based services and storage accounts with capabilities that enable secure submission of comments via external messaging applications.

To begin, a response parsing engine 710 receives a response to a notification 705 from the user (or collaborator). The response includes a text-based comment associated with the content item that the notification indicated and secure message information provided by the notification including a message and a message authentication code. The response parsing engine 710 can extract the secure message information and send the secure message information to a decoder 720. The decoder 720 can decode the secure message information and send the decoded secure message information to a de-scrambler 730 for descrambling using the same secret encryption key 655 that is used to scramble the data.

The de-scrambler 730 outputs the message and the message authentication code to a MAC parsing engine 740. The MAC parsing engine 740 parses out the message and sends the message to the MAC generator 630 for generation of a new message authentication code based on the message using the same secret integrity key 635. The new (or generated message authentication code) is then compared to the received message authentication code by the integrity verification engine 760 to determine the integrity of the message (e.g., to verify that the message has not been tampered with). The integrity verification engine 760 provides an integrity status 761 which can indicate whether or not the integrity check passed. For example, if the generated message authentication code is the same as the received message authentication code then the integrity of the message is verified. Otherwise, the message is not verified.

Figure 8:
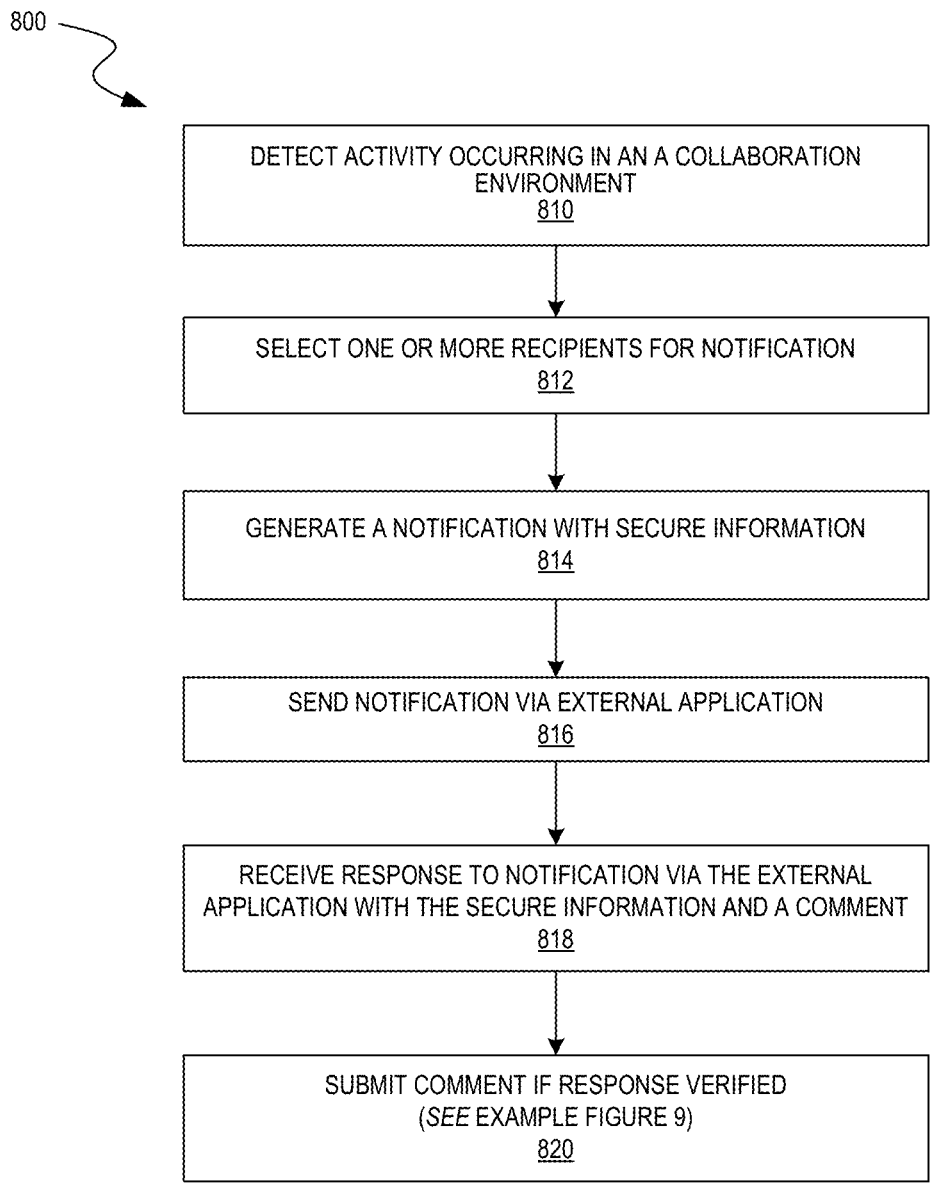
FIG. 8 depicts a flow diagram illustrating an example process for facilitating secure submission of comments to a host server of a cloud service and/or cloud storage accounts via external messaging applications.

FIG. 8 depicts a flow diagram illustrating an example process 800 for facilitating secure submission of comments to a host server of a cloud service and/or cloud storage accounts via external messaging applications. Process 800 may be performed by a host server such as, for example, host server 100 of FIG. 1 or host server 400 of FIG. 4.

In process 810, the host server detects activity occurring in an online collaboration environment. For example, as discussed above, in each work space, when an action is performed on a work item (or content item) by a given user or any other activity is detected in the work space, other users in the same work space may be notified (e.g., in real time or in near real time, or not in real time). In process 812, the host server selects one or more recipient for notification.

In process 814, the host server generates a notification with secure information. For example, the secure information included with the notification so that the response can include this same information. The system is able to detect if the information is tampered with resulting in a secure system. This process is shown and described in greater detail with reference to FIG. 6. In process 816, the host server sends the notification via an external messaging application.

In process 818, the host server receives a response to the notification via the external application with the secure information and a comment. In process 820, the host server submits the comment included in the response to the notification if the response is verified. A more detailed example of process 820 is shown and discussed in greater detail with reference to the example of FIG. 9.

Figure 9:
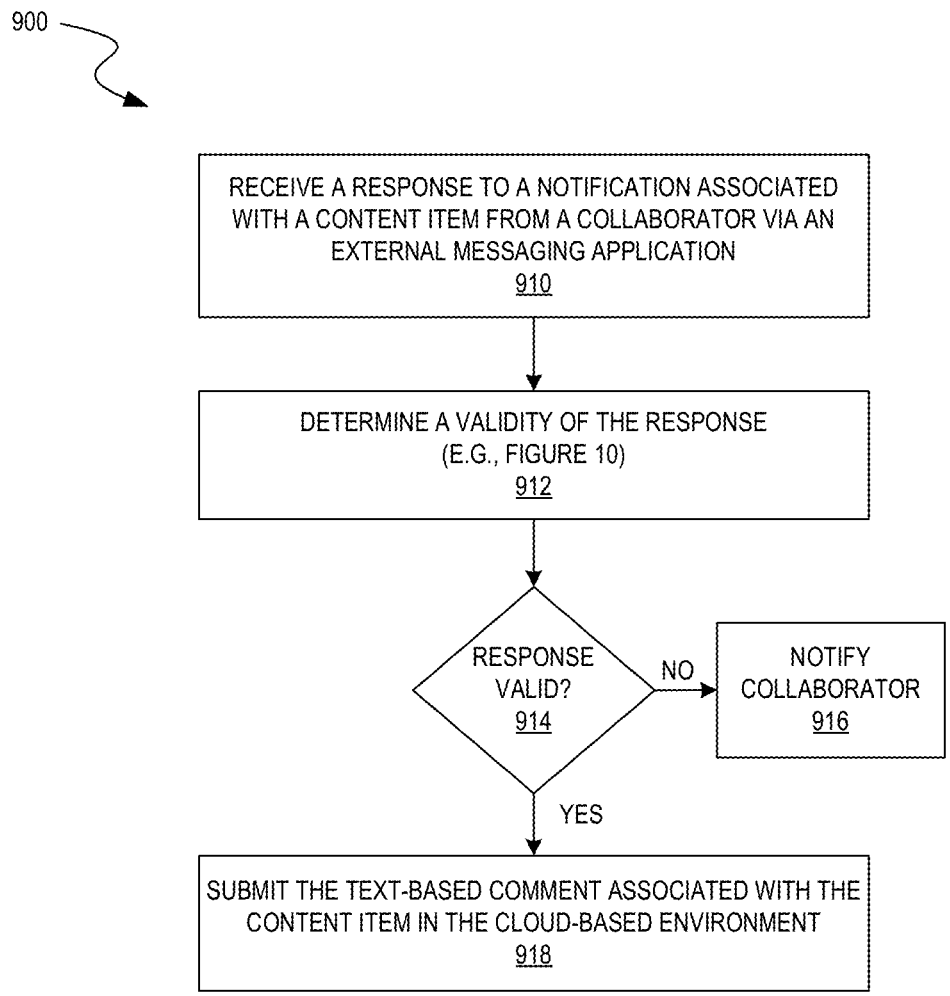
FIG. 9 depicts a flow diagram illustrating an example process for receiving a response at a host server of a cloud service and/or cloud storage accounts via external messaging applications and submitting a comment included in the response if the response is valid.

FIG. 9 depicts a flow diagram illustrating an example process 900 for receiving a response at a host server of a cloud service and/or cloud storage accounts via external messaging applications and submitting a comment included in the response if the response is valid. Process 800 may be performed by a host server such as, for example, host server 100 of FIG. 1 or host server 400 of FIG. 4.

To begin, at process 910, the host server receives a response to a notification associated with a content item from a collaborator via an external messaging application. For example, the host server can receive a response email in response to an email notification. At process 912, the host server determines the validity of the response. An example of the validity determination is shown and discussed in greater detail with reference to FIG. 10.

At a decision process 914, the host server determines whether the response is valid. If not, the host server optionally notifies the collaborator 916 and ends the process without submitting a comment. Other preventative measures may also be taken if the system believes that an attempt was made to modify a response by a malicious user. Otherwise, at process 918, the host server submits the text-based comment associated with the content item in the cloud-based environment.

Figure 10:
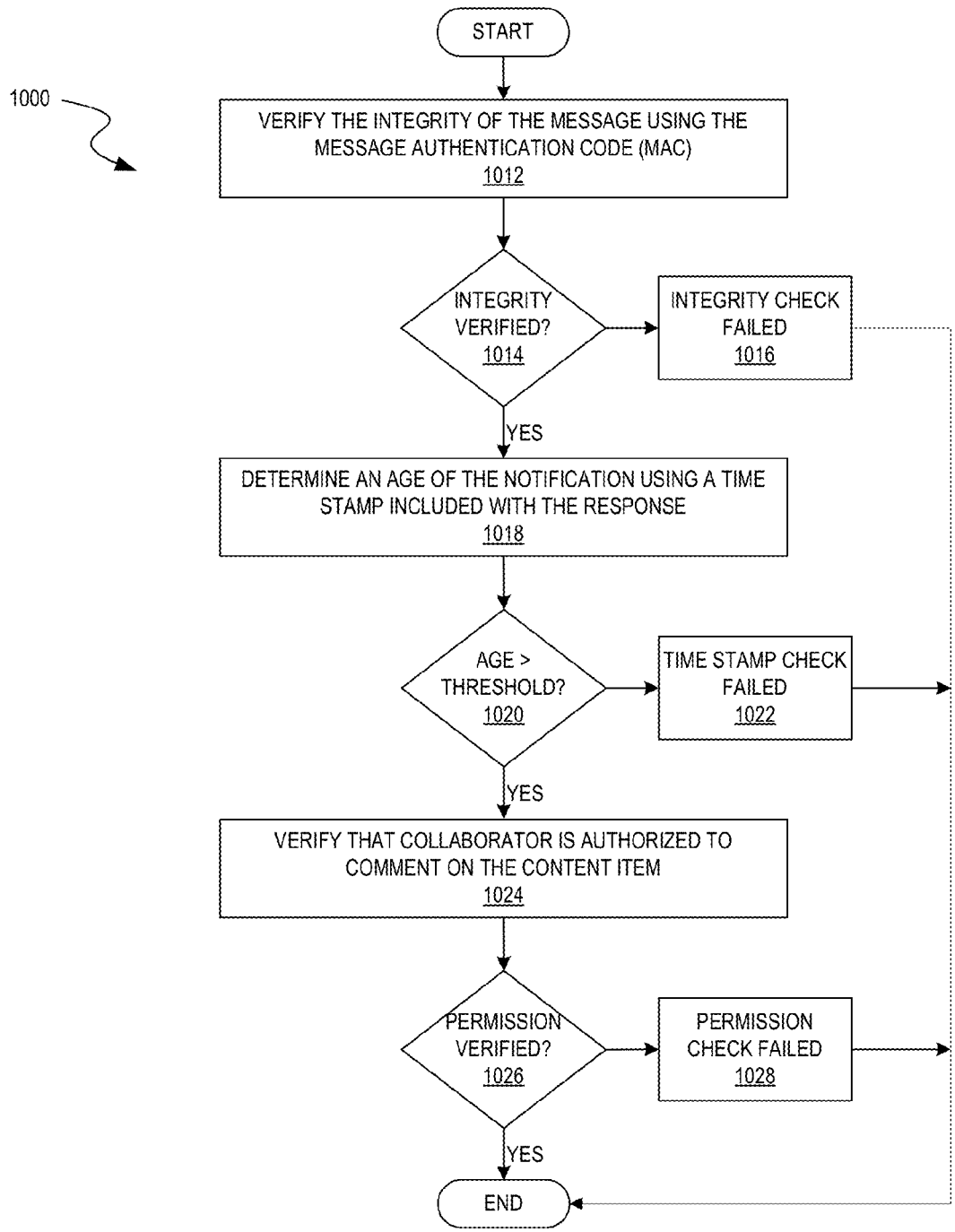
FIG. 10 depicts a flow diagram illustrating an example process for determining whether a response is valid by a host server of a cloud service and/or cloud storage accounts.

FIG. 10 depicts a flow diagram illustrating an example process 1000 for determining whether a response is valid by a host server of a cloud service and/or cloud storage accounts. Process 800 may be performed by a host server such as, for example, host server 100 of FIG. 1 or host server 400 of FIG. 4.

To begin, at process 1012, the host server verifies the integrity of the message using the message authentication code. At decision process 1014, the host server determines if the integrity is verified. If so, the process continues to process 1018. Otherwise, at process 1016, the host server indicates that the integrity check failed.

At process 1018, the host server determines an age of the notification using a time stamp including with the response. At decision process 1020, the host server determines if the age of the notification exceeds a threshold. If so, at process 1022, the host server indicates that the timestamp check failed. Otherwise the process continues to process 1024.

At process 1024, the host server verifies that the collaborator is authorized to comment on the content item. At decision process 1026, if the permission are verified (e.g., the collaborator is authorized to comment on the content item), the process ends successfully with the response validated. Otherwise, at process 1028, the host server indicates that the permission check failed.

FIG. 11 depicts an example electronic mail (email) header 1100 including various header fields that can be used to facilitate secure submission of comments via external messaging applications. As discussed herein, the external messaging application can comprise email and an email header can include various fields (or sub-headers) each having a different meaning as shown in the example of FIG. 11. Other headers (sub-headers) are also possible. Further, the return-path is the same as a reply-to header.

Figure 12:
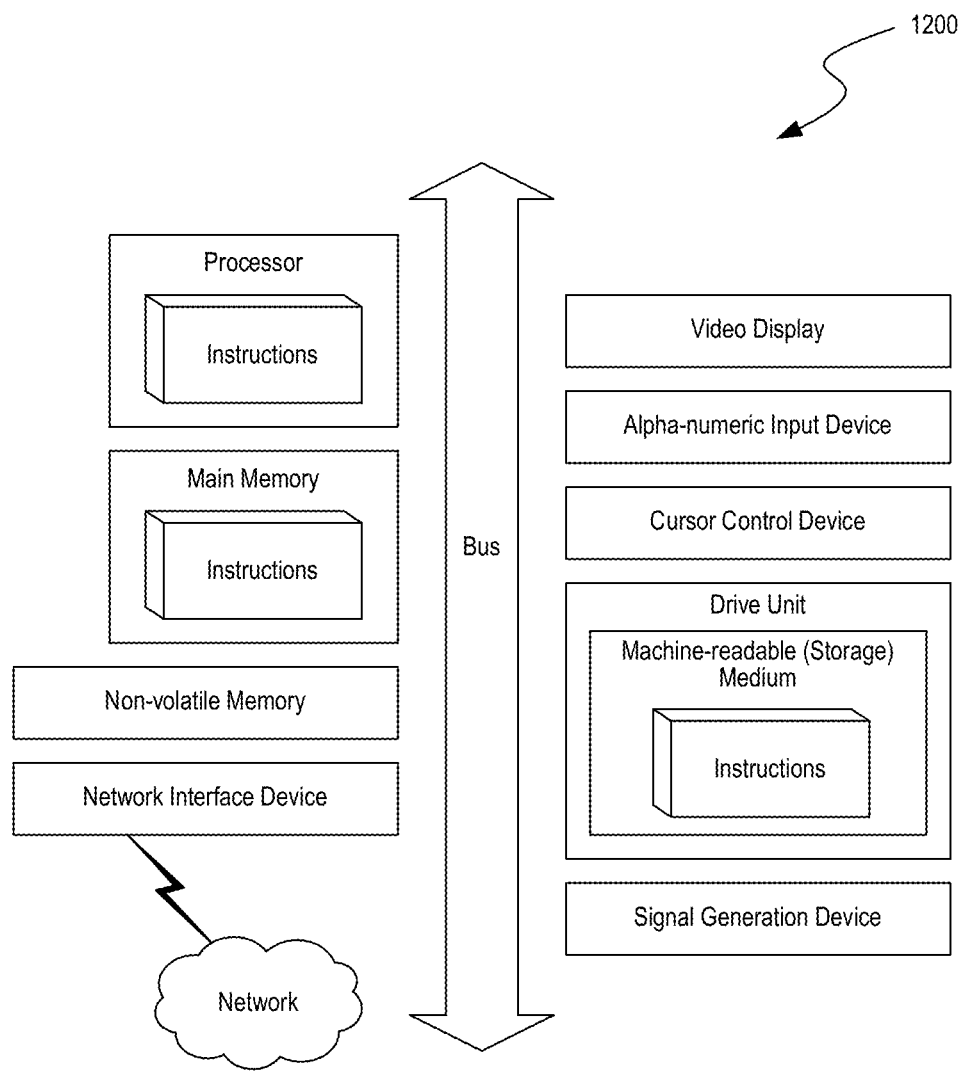
FIG. 12 depicts a diagrammatic representation of a machine in the example form of a computer system within which a set of instructions, for causing the machine to perform any one or more of the methodologies discussed herein, may be executed.

FIG. 12 illustrates a diagrammatic representation of a machine in the example form of a computer system within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a user device, a tablet PC, a laptop computer, a set-top box (STB), a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disks, optical disks (e.g., Compact Disk Read-Only Memory (CD ROMS), Digital Versatile Disks, (DVDs), etc.), among others, and transmission type media such as digital and analog communication links.

The network interface device enables the machine 700 to mediate data in a network with an entity that is external to the host server, through any known and/or convenient communications protocol supported by the host and the external entity. The network interface device can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network interface device can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including for example, the access and operation rights of an object by an individual, a machine, and/or an application, and the circumstances under which the permission rights stand.

Other network security functions can be performed or included in the functions of the firewall, can be, for example, but are not limited to, intrusion-prevention, intrusion detection, next-generation firewall, personal firewall, etc. without deviating from the novel art of this disclosure.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further, any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A method of facilitating secure commenting on content items among collaborators via external messaging applications in a collaborative cloud-based environment, the method comprising:

sending a notification associated with a content item to a collaborator via an external messaging application, wherein the notification includes a message and a message authentication code, the message authentication code generated as a function of the message and to be used to verify the integrity of the message when a response to the notification is received, wherein the message includes one or more of a user identifier associated with the collaborator, an item identifier associated with the content item, or a timestamp;

receiving a response to the notification from the collaborator via the external messaging application, wherein the response includes a text-based comment associated with the content item, the message and the message authentication code; and determining a validity of the response by verifying the integrity of the message using the message authentication code by:

extracting and decoding a response header from the response, the response header including the message and the message authentication code, descrambling the response header using an encryption key to identify the message and the message authentication code, extracting the message and generating a new message authentication code based on the message using an integrity key, and comparing the message authentication code to the new message authentication code to verify the integrity of the message.

2. The method of claim 1, further comprising:
submitting the text-based comment associated with the content item in the cloud-based environment if the response is valid.

3. The method of claim 1,
wherein the integrity of the message is verified if the new authentication code is the same as the message authentication code.

4. The method of claim 1, further comprising:
receiving a notification trigger;
determining a user identifier and a content identifier associated with the notification trigger, wherein the user identifier indicates the collaborator and an the item identifier indicates the content item;
generating the message by concatenating the user identifier and the content identifier; and
generating the message authentication code based on the message.

5. The method of claim 4, wherein generating the message authentication code and the new message authentication code based on the message further comprises:
accessing a secret integrity key; and
applying a deterministic hashing algorithm to the message using the secret integrity key.

6. The method of claim 5, wherein the deterministic hashing algorithm comprises a keyed-hash message authentication code (HMAC).

7. The method of claim 1, wherein determining the validity of the response further comprises:
accessing permissions associated with the content item; and
verifying that the collaborator is authorized to comment on the content item based on the permissions, wherein the response is valid if the collaborator is authorized to comment on the content item.

8. The method of claim 1, wherein determining the validity of the response further comprises:
determining an age of the notification using the timestamp; and
verifying that the age of the notification does not exceed a threshold, wherein the response is not valid if the age of the notification exceeds the threshold.

9. The method of claim 1, wherein the message comprises a user identifier associated with the collaborator and an item identifier associated with the content item.

10. The method of claim 1, wherein the external messaging application comprises email.

11. The method of claim 1, wherein the external messaging application comprises SMS.

12. A non-transitory machine-readable storage medium including executable instructions, which when executed by a processor, causes the processor to facilitate secure commenting on content items among collaborators via external messaging applications in a collaborative cloud-based environment, the instructions comprising:

instructions for sending a notification associated with a content item to a collaborator via an external messaging application, wherein the notification includes a message and a message authentication code, the message authentication code generated as a function of the message and to be used to verify the integrity of the message when a response to the notification is received, wherein the message includes one or more of a user identifier associated with the collaborator, an item identifier associated with the content item, or a timestamp;

instructions for receiving a response to the notification from the collaborator via the external messaging application, wherein the response includes a text-based comment associated with the content item, the message and the message authentication code; and instructions for determining a validity of the response, wherein determining the validity of the response includes verifying the integrity of the message using the message authentication code by:

extracting and decoding a response header from the response, the response header including the message and the message authentication code, descrambling the response header using an encryption key to identify the message and the message authentication code, extracting the message and generating a new message authentication code based on the message using an integrity key, and instructions for comparing the message authentication code to the new message authentication code to verify the integrity of the message.

13. The non-transitory machine-readable storage medium of claim 12, further comprising:
instructions for submitting the text-based comment associated with the content item in the cloud-based environment if the response is valid.

14. The non-transitory machine-readable storage medium of claim 12, wherein the integrity of the message is verified if the new authentication code is the same as the message authentication code.

15. The non-transitory machine-readable storage medium of claim 12, wherein the instructions for sending the notification include:
instructions for generating the notification associated with the content item responsive to a notification trigger; and
instructions for sending the notification to the collaborator via the external messaging application.

16. The non-transitory machine-readable storage medium of claim 15, further comprising:
instructions for receiving the notification trigger;
instructions for determining a user identifier and a content identifier associated with the notification trigger, wherein the user identifier indicates the collaborator and an the item identifier indicates the content item;
instructions for generating the message by concatenating the user identifier and the content identifier; and instructions for generating the message authentication code using the message.

17. The non-transitory machine-readable storage medium of claim 16, wherein the instructions for generating the message authentication code or the new message authentication code based on the message further comprise:
   instructions for accessing a secret integrity key; and
   instructions for applying a deterministic hashing algorithm to the message using the secret integrity key.

18. The non-transitory machine-readable storage medium of claim 17, wherein the deterministic hashing algorithm comprises a keyed-hash message authentication code (HMAC).

19. The non-transitory machine-readable storage medium of claim 12, wherein the instructions for determining the validity of the response further comprise:
   instructions for accessing permissions associated with the content item; and
   instructions for verifying that the collaborator is authorized to comment on the content item based on the permissions, wherein the response is valid if the collaborator is authorized to comment on the content item.

20. The non-transitory machine-readable storage medium of claim 12, wherein the instructions for determining the validity of the response further comprise:
   instructions for determining an age of the notification using the timestamp; and
   instructions for verifying that the age of the notification does not exceed a threshold, wherein the response is not valid if the age of the notification exceeds the threshold.

21. The non-transitory machine-readable storage medium of claim 12, wherein the external messaging application comprises an email or SMS.

22. A collaboration system for facilitating secure commenting on content items among collaborators via external messaging applications in a collaborative cloud-based environment, the method comprising:
   a processor;
   a memory unit having instructions stored thereon which when executed by the processor, causes the collaboration system to:
      send a notification associated with a content item to a collaborator via an external messaging application, wherein the notification includes a message and a message authentication code, the message authentication code generated as a function of the message and to be used to verify the integrity of the message when a response to the notification is received, wherein the message includes one or more of a user identifier associated with the collaborator, an item identifier associated with the content item, or a timestamp;
      determine a validity of a response to the notification received from the collaborator via the external messaging application, wherein the response includes a text-based comment associated with the content item and secure message information provided by the notification including the message and the message authentication code; and
      wherein determining the validity of the response includes verifying the integrity of the message using the message authentication code by:
      extracting and decoding a response header from the response, the response header including the message and the message authentication code,
      descrambling the response header using an encryption key to identify the message and the message authentication code,
      extracting the message and generating a new message authentication code based on the message using an integrity key, and
      comparing the message authentication code to the new message authentication code to verify the integrity of the message.

23. The collaboration system of claim 22, wherein the instructions, when executed by the processor, further causes the collaboration system to:
   submit the text-based comment associated with the content item in the cloud-based environment if the response is valid.

24. The collaboration system of claim 22, wherein the instructions, when executed by the processor, further causes the collaboration system to:
   send the notification associated with the content item to the collaborator via the external messaging application, wherein the notification includes the message information including the message and the message authentication code associated with the message.

25. The collaboration system of claim 22, wherein the instructions, when executed by the processor, further causes the collaboration system to:
   receive a notification trigger;
   determine a user identifier and a content identifier associated with the notification trigger, wherein the user identifier indicates the collaborator and an the item identifier indicates the content item;
   generate the message by concatenating the user identifier and the content identifier; and
   generate the message authentication code based on the message.

26. The collaboration system of claim 25, wherein generating the message authentication code and the new message authentication code based on the message further comprises:
   accessing a secret integrity key; and
   applying a deterministic hashing algorithm to the message using the secret integrity key.

27. The collaboration system of claim 26, wherein the deterministic hashing algorithm comprises a keyed-hash message authentication code (HMAC).

28. A machine-readable non-transitory storage medium including executable instructions, which when executed by a processor, causes the processor to:
   send a notification associated with a content item to a collaborator via an external messaging application, wherein the notification includes a message and a message authentication code, the message authentication code generated as a function of the message and to be used to verify the integrity of the message when a response to the notification is received, wherein the message includes one or more of a user identifier associated with the collaborator, an item identifier associated with the content item, or a timestamp;
   determine a validity of a response to the notification associated with the content item received from the collaborator via the external messaging application, wherein the response includes a text-based comment associated with the content item and secure message information provided by the notification including a message and a message authentication code; and wherein determining the validity of the response includes verifying the integrity of the message using the message authentication code by:
  extracting and decoding a response header from the response, the response header including the message and the message authentication code,
  descrambling the response header using an encryption key to identify the message and the message authentication code,
  extracting the message and generating a new message authentication code based on the message using an integrity key, and
  comparing the message authentication code to the new message authentication code to verify the integrity of the message.

* * * * *